(12) United States Patent
Si et al.

(10) Patent No.: US 11,128,154 B2
(45) Date of Patent: Sep. 21, 2021

(54) CHARGING METHOD AND RELATED DEVICE

(71) Applicant: Huawei Technologies Co., Ltd., Shenzhen (CN)

(72) Inventors: Hui Si, Beijing (CN); Haohui Long, Beijing (CN); Jianping Fang, Beijing (CN); Yanlin Wang, Dongguan (CN); Taixiang Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/828,508

(22) Filed: Mar. 24, 2020

(65) Prior Publication Data

US 2020/0244078 A1 Jul. 30, 2020

Related U.S. Application Data

(63) Continuation of application No. 16/095,848, filed as application No. PCT/CN2016/105856 on Nov. 15, 2016, now Pat. No. 10,630,091.

(51) Int. Cl.
*H02J 7/00* (2006.01)

(52) U.S. Cl.
CPC .......... *H02J 7/0029* (2013.01); *H02J 7/0042* (2013.01); *H02J 7/0047* (2013.01); *H02J 7/00* (2013.01)

(58) Field of Classification Search
CPC ...... H02J 7/0029; H02J 7/0042; H02J 7/0047; H02J 7/00; H02J 7/007192; H02J 7/00034; H02J 7/0031
See application file for complete search history.

(56) References Cited

U.S. PATENT DOCUMENTS 7,592,776 B2 * 9/2009 Tsukamoto ........... H01M 10/44
320/136
8,941,957 B2 * 1/2015 Yuno ..................... H02H 3/167
361/42

(Continued)

FOREIGN PATENT DOCUMENTS

CN 101039036 A 9/2007
CN 100488001 C 5/2009

(Continued)

OTHER PUBLICATIONS

Machine Translation and Abstract of Japanese Publication No. JP2015008582, Jan. 15, 2015, 20 pages.

(Continued)

*Primary Examiner* — Stacy Whitmore
(74) *Attorney, Agent, or Firm* — Conley Rose, P.C.

(57) ABSTRACT

A charging method and a related device are provided. A charge protection apparatus includes a micro control unit MCU, a current detection circuit, a gating circuit, and an I/O interface. The current detection circuit detects an external charging current flowing through a power cable. The current detection circuit transmits the external charging current to the MCU. The MCU transmits the external charging current to a user terminal by using the I/O interface, so that the user terminal calculates a current difference between the external charging current and an internal charging current detected by the user terminal, and determines, based on the current difference, whether to generate a circuit control command. The MCU receives the circuit control command sent by the user terminal, and controls, according to the circuit control command, the gating circuit to be in a closed state or an open state.

20 Claims, 11 Drawing Sheets

(56) References Cited

U.S. PATENT DOCUMENTS

| | | | |
|---|---|---|---|
| 9,257,855 B2* | 2/2016 | Ishikawa | H02J 7/0032 |
| 9,350,181 B2* | 5/2016 | Xiang | H02J 7/32 |
| 9,632,583 B2* | 4/2017 | Virtanen | G06F 3/016 |
| 9,751,413 B2* | 9/2017 | Im | H02J 7/007 |
| 9,893,542 B2* | 2/2018 | Hwang | H02J 7/00712 |
| 10,033,204 B2* | 7/2018 | Huang | H02J 7/0071 |
| 10,079,496 B2* | 9/2018 | Huang | H02J 7/0071 |
| 10,181,742 B2* | 1/2019 | Hsu | H02J 7/007 |
| 10,218,209 B2* | 2/2019 | Kamath | H02J 7/007 |
| 10,574,074 B2* | 2/2020 | Jung | H02J 7/007 |
| 2005/0151506 A1 | 7/2005 | Kennedy et al. | |
| 2010/0250192 A1* | 9/2010 | Deokar | H02J 9/061 702/182 |
| 2013/0057058 A1 | 3/2013 | Ribich | |
| 2014/0267059 A1* | 9/2014 | Deokar | H02J 7/00 345/173 |
| 2015/0022141 A1 | 1/2015 | Oku | |
| 2015/0205357 A1 | 7/2015 | Virtanen et al. | |
| 2015/0339909 A1 | 11/2015 | Kung et al. | |
| 2016/0064959 A1* | 3/2016 | Jung | H02J 7/00036 320/162 |
| 2016/0075244 A1 | 3/2016 | Im | |
| 2016/0094058 A1* | 3/2016 | Han | H02J 9/06 320/112 |
| 2016/0149394 A1* | 5/2016 | Trusty | H02H 5/083 361/59 |
| 2016/0336761 A1* | 11/2016 | Hsu | H02J 7/007 |
| 2016/0344228 A1 | 11/2016 | Zhang | |
| 2016/0352132 A1 | 12/2016 | Zhang et al. | |
| 2016/0380464 A1* | 12/2016 | Chin | H02J 7/025 320/108 |
| 2017/0093105 A1* | 3/2017 | Belinksky | G06Q 10/0631 |
| 2017/0108910 A1* | 4/2017 | Goh | G06F 13/385 |
| 2017/0207648 A1 | 7/2017 | Xiao | |
| 2017/0250553 A1 | 8/2017 | Zhang et al. | |
| 2017/0250555 A1 | 8/2017 | Zhang et al. | |
| 2017/0358945 A1 | 12/2017 | Zhang et al. | |
| 2019/0081501 A1* | 3/2019 | Sun | G01R 31/3647 |
| 2019/0109480 A1* | 4/2019 | Hsu | G05F 1/56 |
| 2020/0014232 A1 | 1/2020 | Zhang et al. | |
| 2020/0052510 A1* | 2/2020 | Yu | H02J 7/0042 |
| 2020/0330263 A1* | 10/2020 | Dabrowiak | F25B 1/005 |

FOREIGN PATENT DOCUMENTS

| | | | |
|---|---|---|---|
| CN | 103779907 A | 5/2014 | |
| CN | 103986040 A | 8/2014 | |
| CN | 104333088 A | 2/2015 | |
| CN | 104345201 A | 2/2015 | |
| CN | 105978057 A | 9/2016 | |
| EP | 2977770 B1 | 5/2019 | |
| JP | 2000270463 A | 9/2000 | |
| JP | 2003028400 A | 1/2003 | |
| JP | 2007228716 A | 9/2007 | |
| JP | 2015008582 A | 1/2015 | |
| JP | 2015023712 A | 2/2015 | |
| JP | 2016063737 A | 4/2016 | |
| JP | 2016524455 A | 8/2016 | |
| JP | 2017505101 A | 2/2017 | |
| JP | 2017506053 A | 2/2017 | |
| JP | 2017506054 A | 2/2017 | |
| JP | 2017506055 A | 2/2017 | |
| JP | 2017506489 A | 3/2017 | |
| JP | 2017521990 A | 8/2017 | |
| TW | 201545431 A | 12/2015 | |
| WO | 2015113349 A1 | 8/2015 | |
| WO | WO-2016106616 A1 * | 7/2016 | H02H 7/18 |
| WO | 2016148638 A1 | 9/2016 | |

OTHER PUBLICATIONS

Machine Translation and Abstract of Japanese Publication No. JP2016524455, Aug. 12, 2016, 48 pages.

* cited by examiner

CHARGING METHOD AND RELATED DEVICE

CROSS-REFERENCE TO RELATED APPLICATIONS

This application is a continuation of U.S. patent application Ser. No. 16/095,848 filed on Oct. 23, 2018, which is a National Stage of International Patent Application No. PCT/CN2016/105856 filed on Nov. 15, 2016. All of the aforementioned applications are hereby incorporated by reference in their entireties.

TECHNICAL FIELD

The present invention relates to the field of electronic technologies, and in particular, to a charging method and a related device.

BACKGROUND

With rapid development of electronic technologies, upgrading of user terminals accelerates. For example, commonly used user terminals such as mobile phones, tablet computers, wearable devices have become an important part of people's daily life. Most user terminals need to be charged by using a power supply device. In an example of a mobile phone, one Universal Serial Bus (Universal Serial Bus, USB) port, on a charging data cable, that is used to connect to a power source and that matches the mobile phone is connected to a power source charger or a computer, and the other USB port on the charging data cable is connected to a charging port of the mobile phone, to charge the mobile phone.

In an actual application, in a charging process of the user terminal, a leakage current at the charging port, an extremely high current, and an extremely high voltage may cause damage to the mobile phone to some extent. In an existing technical solution, a protection circuit designed inside the user terminal can protect the user terminal from the extremely high current or the extremely high voltage. However, in a case of a short circuit at the charging port, before flowing into the protection circuit inside the user terminal, some currents flowing through the charging port are short-circuited to ground. In this case, if a current detected by the protection circuit does not exceed a preset current threshold, the protection circuit considers that charging is normal, and the user terminal remains in a charging state. This causes the charging port to be burned due to the extremely high current, and reduces charging security of the user terminal.

SUMMARY

Embodiments of the present invention provide a charging method and a related device. A charging current is monitored in real time, so that a user terminal monitors whether a leakage current exists in a current charging process, and in a case of the leakage current, a power cable is disconnected in time by using a charge protection apparatus, so as to protect the user terminal.

According to a first aspect, an embodiment of the present invention provides a charge protection apparatus, where the charge protection apparatus is connected to a charging cable, and the charging cable includes a power cable and a data cable;

the charge protection apparatus includes a micro control unit MCU, a current detection circuit, a gating circuit, and an I/O interface;

the current detection circuit and the gating circuit are disposed on the power cable; if the gating circuit is in a closed state, the power cable is not disconnected from charging, or if the gating circuit is in an open state, the power cable is disconnected from charging; the I/O interface and the data cable are connected; and the MCU sends data by using the I/O interface; and the current detection circuit detects an external charging current flowing through the power cable; the current detection circuit transmits the external charging current to the MCU; the MCU transmits the external charging current to a user terminal by using the I/O interface, so that the user terminal calculates a current difference between the external charging current and an internal charging current detected by the user terminal, and determines, based on the current difference, whether to generate a circuit control command; and the MCU receives the circuit control command sent by the user terminal, and controls, according to the circuit control command, the gating circuit to be in the closed state or the open state.

According to the first aspect of the embodiments of the present invention, a charging current is monitored in real time, so that the user terminal monitors whether a leakage current exists in a current charging process, and in a case of the leakage current, the power cable is disconnected from charging in time by using the charge protection apparatus, so as to protect the user terminal.

With reference to the first aspect, in a first implementation of the first aspect, the charge protection apparatus further includes a temperature detection circuit;

the temperature detection circuit detects a temperature of the charging cable, and transmits the temperature of the charging cable to the MCU; and the MCU transmits the temperature of the charging cable to the user terminal by using the I/O interface, so that the user terminal determines, based on the temperature of the charging cable, whether to generate the circuit control command; and the MCU receives the circuit control command sent by the user terminal, and controls, according to the circuit control command, the gating circuit to be in the closed state or the open state.

Optionally, the charge protection apparatus is disposed at a position close to a USB port connected to a charging port of the user terminal, so that the temperature detection circuit can more accurately detect the temperature of the charging port of the user terminal.

With reference to the first aspect or the first implementation of the first aspect, in a second implementation of the first aspect, the charge protection apparatus further includes a voltage detection circuit, and the voltage detection circuit is disposed on the power cable;

the voltage detection circuit detects an external charging voltage of the power cable, and transmits the external charging voltage to the MCU; and the MCU transmits the external charging voltage to the user terminal by using the I/O interface, so that the user terminal determines, based on the external charging voltage, whether to generate the circuit control command; and the MCU receives the circuit control command sent by the user terminal, and controls, according to the circuit control command, the gating circuit to be in the closed state or the open state.

With reference to the first aspect, the first implementation of the first aspect, or the second implementation of the first aspect, in a third implementation of the first aspect, the controlling, according to the circuit control command, the gating circuit to be in the closed state or the open state includes:

if the circuit control command is to keep charging, the MCU controls the gating circuit to be in the closed state; or if the circuit control command is to disconnect from charging, the MCU controls the gating circuit to be in the open state.

With reference to the first aspect, the first implementation of the first aspect, the second implementation of the first aspect, or the third implementation of the first aspect, in a fourth implementation of the first aspect, the charge protection apparatus further includes a prompt circuit, the charge protection apparatus further includes a buzzer, an indicator, and/or an oscillator, and the prompt circuit is configured to control whether the buzzer rings, control whether the indicator flickers, and/or control whether the oscillator oscillates; and if a first warning prompt is set in the circuit control command, the MCU performs a warning operation according to the first warning prompt by using the prompt circuit.

Optionally, the first warning prompt carries a first time interval for a first prompt mode and a second time interval for a second prompt mode; and that the MCU controls, according to the first warning prompt by using the prompt circuit, the buzzer to ring and the indicator to flicker is specifically: the MCU performs, based on a time interval for each prompt mode by using the prompt circuit, an operation corresponding to each prompt mode.

Optionally, the prompt circuit is configured to control whether the buzzer rings, control whether the indicator flickers, and/or control whether the oscillator oscillates. The charge protection apparatus may include one or more of the buzzer, the indicator, and the oscillator. It may be understood that, if the buzzer is included, the first warning prompt may include a prompt mode in which the buzzer rings; if the indicator is included, the first warning prompt may include a prompt mode in which the indicator flickers; or if the oscillator is included, the first warning prompt may include a prompt mode in which the oscillator oscillates.

Further, optionally, when the first warning prompt may include a plurality of prompt modes, one or more of the prompt modes may be selected for prompting. This is not limited in this embodiment of the present invention. In this way, a user is prompted in the prompt mode, so that the user can learn of a current charging status in time.

With reference to the first aspect, the first implementation of the first aspect, the second implementation of the first aspect, the third implementation of the first aspect, or the fourth implementation of the first aspect, in a fifth implementation of the first aspect, the charge protection apparatus further includes a port status detection circuit, and the port status detection circuit and the gating circuit are connected in parallel; and when the gating circuit is in the open state, if the port status detection circuit detects that the gating circuit is disconnected from the power supply apparatus or is disconnected from the charging port of the user terminal, the port status detection circuit notifies the MCU that the port connection has been broken, and the MCU controls the gating circuit to be in the closed state.

Optionally, the port status detection circuit may include a current limiting resistor and a micro current detection circuit. Because the port status detection circuit and the gating circuit are connected in parallel, the port status detection circuit is equivalent to another closed circuit on the power cable. However, herein, setting a resistance value of the current limiting resistor can enable a current of the closed circuit to be at a milliampere scale or even smaller, and the current can be detected by using the micro current detection circuit. Therefore, once the gating circuit is in the open state, the port status detection circuit notifies the MCU that the gating circuit is disconnected from the charging port, so that the MCU controls the gating circuit to restore to the closed state, helping the charge protection apparatus perform protection for a next charging connection.

According to a second aspect, an embodiment of the present invention provides a charging data cable, where the charging data cable includes the charge protection apparatus provided in the first aspect. In this embodiment of the present invention, the charging data cable may receive a circuit control command that is generated by a user terminal based on a result of comparison between an internal charging current and an external charging current, and further control whether a power cable is disconnected from charging, so as to protect the user terminal. The charge protection apparatus is usually disposed near a port of the user terminal on the charging data cable.

According to a third aspect, an embodiment of the present invention provides a charger, where the charger includes the charge protection apparatus provided in the first aspect. In this embodiment of the present invention, the charger may receive a circuit control command that is generated by a user terminal based on a result of comparison between an internal charging current and an external charging current, and further control whether a power cable is disconnected from charging, so as to protect the user terminal.

According to a fourth aspect, an embodiment of the present invention provides a charge protection apparatus, where the charge protection apparatus is connected to a charging cable, the charging cable includes a power cable and a data cable, and the charge protection apparatus includes a detection unit, a sending unit, a receiving unit, and a control unit;

the control unit is configured to detect an external charging current of the power cable by using the detection unit;

the control unit is further configured to send the external charging current to a user terminal by using the sending unit, so that the user terminal calculates a current difference between the external charging current and an internal charging current detected by the user terminal, and determines, based on the current difference, whether to generate a circuit control command;

the control unit is further configured to receive, by using the receiving unit, the circuit control command sent by the user terminal; and the control unit is further configured to control, according to the circuit control command, whether the power cable is disconnected from charging.

According to the fourth aspect of the embodiments of the present invention, a charging current is monitored in real time, so that the user terminal monitors whether a leakage current exists in a current charging process, and in a case of the leakage current, the power cable is disconnected from charging in time by using the charge protection apparatus, so as to protect the user terminal.

With reference to the fourth aspect, in a first implementation of the fourth aspect, the control unit is further configured to: detect a temperature of the charging cable by using the detection unit, and send the temperature of the charging cable to the user terminal, so that the user terminal determines, based on the temperature of the charging cable, whether to generate the circuit control command. Therefore, a charging port can be better protected by performing temperature detection.

With reference to the fourth aspect or the first implementation of the fourth aspect, in a second implementation of the fourth aspect, the control unit is further configured to: detect an external charging voltage of the power cable by using the detection unit, and send the external charging voltage to the user terminal, so that the user terminal determines, based on the external charging voltage, whether to generate the circuit control command. The user terminal can be better protected by performing external charging voltage detection.

With reference to the fourth aspect, the first implementation of the fourth aspect, or the second implementation of the fourth aspect, in a third implementation of the fourth aspect, with regard to the controlling, according to the circuit control command, whether the power cable is disconnected from charging, the control unit is specifically configured to:

if the circuit control command is to keep charging, control the power cable to remain in a charging connection; or if the circuit control command is to disconnect from charging, control the power cable to disconnect from charging. It may be understood that, if the circuit control command sent by the user terminal is not received, the charging data cable remains in a charging state, and in this case, the power cable remains in the charging connection.

With reference to the third implementation of the fourth aspect, in a fourth implementation of the fourth aspect, the control unit is further configured to: if a first warning prompt is set in the circuit control command, perform a warning operation according to the first warning prompt.

Optionally, at least one prompt mode and a time interval for executing each prompt mode are set in the first warning prompt; and the control unit is specifically configured to: if the first warning prompt is set in the circuit control command, perform, based on the time interval for each prompt mode, an operation corresponding to each prompt mode.

Optionally, when the first warning prompt may include a plurality of prompt modes, one or more of the prompt modes may be selected for prompting. This is not limited in this embodiment of the present invention. In this way, a user is prompted in the prompt mode, so that the user can learn of a current charging status in time.

With reference to the fourth aspect, the first implementation of the fourth aspect, the second implementation of the fourth aspect, the third implementation of the fourth aspect, or the fourth implementation of the fourth aspect, in a fifth implementation of the fourth aspect, the control unit is further configured to: when the power cable is disconnected from charging, if it is detected that the power cable is disconnected from the power supply apparatus or is disconnected from the charging port of the user terminal, control the power cable to establish a charging connection.

According to a fifth aspect, an embodiment of the present invention provides a charging data cable, where the charging data cable includes the charge protection apparatus provided in the first aspect. In this embodiment of the present invention, the charging data cable may receive a circuit control command that is generated by a user terminal based on a result of comparison between an internal charging current and an external charging current, and further control whether a power cable is disconnected from charging, so as to protect the user terminal. The charge protection apparatus is usually disposed near a port of the user terminal on the charging data cable.

According to a sixth aspect, an embodiment of the present invention provides a charger, where the charger includes the charge protection apparatus provided in the first aspect. In this embodiment of the present invention, the charger may receive a circuit control command that is generated by a user terminal based on a result of comparison between an internal charging current and an external charging current, and further control whether a power cable is disconnected from charging, so as to protect the user terminal.

According to a seventh aspect, an embodiment of the present invention provides a user terminal, including a detection unit, a receiving unit, a processing unit, and a sending unit;

the processing unit is configured to detect an internal charging current by using the detection unit;

the processing unit is further configured to receive, by using the receiving unit, an external charging current sent by the charge protection apparatus;

the processing unit is further configured to calculate a current difference between the external charging current and the internal charging current;

the processing unit is further configured to determine, based on the current difference, whether to generate a circuit control command; and the processing unit is further configured to: if the circuit control command is generated, send the circuit control command to the charge protection apparatus by using the sending unit.

According to the seventh aspect of the embodiments of the present invention, a charging current is monitored in real time, so that the user terminal monitors whether a leakage current exists in a current charging process, and in a case of the leakage current, a power cable is disconnected from charging in time by using the charge protection apparatus, so as to protect the user terminal.

With reference to the seventh aspect, in a first implementation of the seventh aspect, with regard to the determining, based on the current difference, whether to generate a circuit control command, the processing unit is specifically configured to:

if the current difference is greater than a first current threshold and less than a second current threshold, determine that the generated circuit control command is to keep charging; or if the current difference is greater than the second current threshold and less than a third current threshold, determine that the generated circuit control command is to disconnect from charging.

It may be understood that, if the current difference is less than the first current threshold, the user terminal does not generate the circuit control command.

With reference to the first implementation of the seventh aspect, in a second implementation of the seventh aspect, the user terminal further includes a first output unit;

the processing unit is further configured to: if the current difference is greater than the first current threshold and less than the second current threshold, output a first pop-up prompt on a screen by using the first output unit, where the first pop-up prompt is a prompt message used to indicate that the current difference exists in a current charging process; and the processing unit is further configured to: if the current difference is greater than the second current threshold and less than the third current threshold, output a second pop-up prompt on the screen by using the first output unit, where the second pop-up prompt is a prompt message used to indicate that the current difference exists in the current charging process and charging is disconnected.

The pop-up prompt may be used to instruct a user to check in time whether there is a problem of liquid intake, corrosion, or the like for a charging port of the user terminal.

With reference to the seventh aspect, the first implementation of the seventh aspect, or the second implementation of the seventh aspect, in a third implementation of the seventh aspect, the processing unit is further configured to receive, by using the receiving unit, a temperature of a charging cable that is sent by the charge protection apparatus; and the processing unit is further configured to determine, based on the temperature of the charging cable, whether to generate the circuit control command. The charging port can be better protected by using a temperature detection mechanism.

With reference to the third implementation of the seventh aspect, in a fourth implementation of the seventh aspect, with regard to the determining, based on the temperature of the charging cable, whether to generate the circuit control command, the processing unit is specifically configured to:

if the temperature of the charging cable is greater than a first temperature threshold and less than a second temperature threshold, determine that the generated circuit control command is to keep charging; or if the temperature of the charging cable is greater than the second temperature threshold, determine that the generated circuit control command is to disconnect from charging.

It may be understood that, if the temperature of the charging cable is less than the first temperature threshold, the user terminal does not generate the circuit control command.

With reference to the fourth implementation of the seventh aspect, in a fifth implementation of the seventh aspect, the user terminal further includes a second output unit;

the processing unit is further configured to: if the temperature of the charging cable is greater than the first temperature threshold and less than the second temperature threshold, output a third pop-up prompt on the screen by using the second output unit, where the third pop-up prompt is a prompt message used to indicate that the temperature of the charging cable is extremely high in the current charging process; and the processing unit is further configured to: if the temperature of the charging cable is greater than the second temperature threshold and less than the third temperature threshold, output a fourth pop-up prompt on the screen by using the second output unit, where the fourth pop-up prompt is a prompt message used to indicate that the temperature of the charging cable is extremely high in the current charging process and charging is disconnected.

The pop-up prompt may be used to instruct the user to check in time whether there is a problem of liquid intake, corrosion, or the like for the charging port of the user terminal.

With reference to the seventh aspect, the first implementation of the seventh aspect, the second implementation of the seventh aspect, the third implementation of the seventh aspect, the fourth implementation of the seventh aspect, or the fifth implementation of the seventh aspect, in a sixth implementation of the seventh aspect, the processing unit is further configured to receive, by using the receiving unit, an external charging voltage sent by the charge protection apparatus; and the processing unit is further configured to determine, based on the external charging voltage, whether to generate the circuit control command. The user terminal can be better protected by performing external charging voltage detection.

With reference to the sixth implementation of the seventh aspect, in a seventh implementation of the seventh aspect, with regard to the determining, based on the external charging voltage, whether to generate the circuit control command, the processing unit is specifically configured to:

if the external charging voltage is greater than a first voltage threshold and less than a second voltage threshold, determine that the generated circuit control command is to keep charging; or if the external charging voltage is greater than the second voltage threshold, determine that the generated circuit control command is to disconnect from charging.

It may be understood that, if the external charging voltage of the power cable is less than the first voltage threshold, the user terminal does not generate the circuit control command.

With reference to the seventh implementation of the seventh aspect, in an eighth implementation of the seventh aspect, the user terminal further includes a third output unit;

the processing unit is further configured to: if the external charging voltage is greater than the first voltage threshold and less than the second voltage threshold, output a fifth pop-up prompt on the screen by using the third output unit, where the fifth pop-up prompt is a prompt message used to indicate that the external charging voltage is extremely high in the current charging process; and the processing unit is further configured to: if the external charging voltage is greater than the second voltage threshold and less than the third voltage threshold, output a sixth pop-up prompt on the screen by using the third output unit, where the sixth pop-up prompt is a prompt message used to indicate that the external charging voltage is extremely high in the current charging process and charging is disconnected.

The pop-up prompt may be used to instruct the user to check in time whether there is a problem of liquid intake, corrosion, or the like for the charging port of the user terminal.

Optionally, the user terminal further includes a fourth output unit; and the processing unit is further configured to output the internal charging current, the external charging current, and the external charging voltage on the screen by using the fourth output unit.

Optionally, the processing unit may output at least one of the internal charging current, the external charging current, and the external charging voltage.

Optionally, a first warning prompt is set in the circuit control command, and the first warning prompt is used to instruct the charge protection apparatus to perform a warning operation according to the first warning prompt. Further, optionally, at least one prompt mode and a time interval for executing each prompt mode are set in the first warning prompt.

With reference to the seventh aspect, the first implementation of the seventh aspect, the second implementation of the seventh aspect, the third implementation of the seventh aspect, the fourth implementation of the seventh aspect, the fifth implementation of the seventh aspect, the sixth implementation of the seventh aspect, the seventh implementation of the seventh aspect, or the eighth implementation of the seventh aspect, in a ninth implementation of the seventh aspect, the processing unit is further configured to perform a warning operation based on a preset second warning prompt if the circuit control command is generated, where the second warning prompt includes at least one prompt mode. For example, the prompt mode may include one or more of a sound prompt mode, a flicker prompt mode, and an oscillation prompt mode, and the prompt mode in the second warning prompt is not limited to these prompt modes. The circuit control command may be a command for keeping charging or disconnecting from charging, and therefore the user terminal may set different prompt modes for different commands. In this way, the user is prompted in the prompt mode, so that the user can learn of a current charging status in time.

According to an eighth aspect, an embodiment of the present invention provides a charging method, where the method is applied to a charge protection apparatus, a charging cable in the charge protection apparatus includes a power cable and a data cable, and the method includes:

detecting, by the charge protection apparatus, an external charging current of the power cable;

sending, by the charge protection apparatus, the external charging current to a user terminal, so that the user terminal calculates a current difference between the external charging current and an internal charging current detected by the user terminal, and determines, based on the current difference, whether to generate a circuit control command;

receiving, by the charge protection apparatus, the circuit control command sent by the user terminal; and controlling, by the charge protection apparatus according to the circuit control command, whether the power cable is disconnected from charging.

According to the eighth aspect of the embodiments of the present invention, a charging current is monitored in real time, so that the user terminal monitors whether a leakage current exists in a current charging process, and in a case of the leakage current, the power cable is disconnected from charging in time by using the charge protection apparatus, so as to protect the user terminal.

With reference to the eighth aspect, in a first implementation of the eighth aspect, before the receiving, by the charge protection apparatus, the circuit control command sent by the user terminal, the method further includes:

detecting, by the charge protection apparatus, a temperature of the charging cable, and sending the temperature of the charging cable to the user terminal, so that the user terminal determines, based on the temperature of the charging cable, whether to generate the circuit control command. Therefore, a charging port can be better protected by performing temperature detection.

With reference to the eighth aspect or the first implementation of the eighth aspect, in a second implementation of the eighth aspect, before the receiving, by the charge protection apparatus, the circuit control command sent by the user terminal, the method further includes:

detecting, by the charge protection apparatus, an external charging voltage of the power cable, and sending the external charging voltage to the user terminal, so that the user terminal determines, based on the external charging voltage, whether to generate the circuit control command. The user terminal can be better protected by performing external charging voltage detection.

With reference to the eighth aspect, the first implementation of the eighth aspect, or the second implementation of the eighth aspect, in a third implementation of the eighth aspect, the controlling, by the charge protection apparatus according to the circuit control command, whether the power cable is disconnected from charging includes:

if the circuit control command is to keep charging, controlling, by the charge protection apparatus, the power cable to remain in a charging connection; or if the circuit control command is to disconnect from charging, controlling, by the charge protection apparatus, the power cable to disconnect from charging. It may be understood that, if the circuit control command sent by the user terminal is not received, the charging data cable remains in a charging state, and in this case, the power cable remains in the charging connection.

With reference to the third implementation of the eighth aspect, in a fourth implementation of the eighth aspect, the method further includes:

performing, by the charge protection apparatus if a first warning prompt is set in the circuit control command, a warning operation according to the first warning prompt.

Optionally, at least one prompt mode and a time interval for executing each prompt mode are set in the first warning prompt; and the performing, by the charge protection apparatus if a first warning prompt is set in the circuit control command, a warning operation according to the first warning prompt includes: if the first warning prompt is set in the circuit control command, performing, by the charge protection apparatus based on the time interval for each prompt mode, an operation corresponding to each prompt mode.

Optionally, when the first warning prompt may include a plurality of prompt modes, one or more of the prompt modes may be selected for prompting. This is not limited in this embodiment of the present invention. In this way, a user is prompted in the prompt mode, so that the user can learn of a current charging status in time.

With reference to the eighth aspect, the first implementation of the eighth aspect, the second implementation of the eighth aspect, the third implementation of the eighth aspect, or the fourth implementation of the eighth aspect, in a fifth implementation of the eighth aspect, the method further includes:

when the power cable is disconnected from charging, if it is detected that the power cable is disconnected from the power supply apparatus or is disconnected from the charging port of the user terminal, controlling, by the charge protection apparatus, the power cable to establish a charging connection.

According to a ninth aspect, an embodiment of the present invention provides a charging method, including:

detecting, by a user terminal, an internal charging current;

receiving, by the user terminal, an external charging current sent by the charge protection apparatus;

calculating, by the user terminal, a current difference between the external charging current and the internal charging current;

determining, by the user terminal based on the current difference, whether to generate a circuit control command; and sending, by the user terminal, the circuit control command to the charge protection apparatus if the circuit control command is generated.

According to the ninth aspect of the embodiments of the present invention, a charging current is monitored in real time, so that the user terminal monitors whether a leakage current exists in a current charging process, and in a case of the leakage current, a power cable is disconnected from charging in time by using the charge protection apparatus, so as to protect the user terminal.

With reference to the ninth aspect, in a first implementation of the ninth aspect, the determining, by the user terminal based on the current difference, whether to generate a circuit control command includes:

if the current difference is greater than a first current threshold and less than a second current threshold, determining, by the user terminal, that the generated circuit control command is to keep charging; or if the current difference is greater than the second current threshold and less than a third current threshold, determining, by the user terminal, that the generated circuit control command is to disconnect from charging.

It may be understood that, if the current difference is less than the first current threshold, the user terminal does not generate the circuit control command.

With reference to the first implementation of the ninth aspect, in a second implementation of the ninth aspect, the method further includes:

if the current difference is greater than the first current threshold and less than the second current threshold, outputting, by the user terminal, a first pop-up prompt on a screen, where the first pop-up prompt is a prompt message used to indicate that the current difference exists in a current charging process; or if the current difference is greater than the second current threshold and less than the third current threshold, outputting, by the user terminal, a second pop-up prompt on the screen, where the second pop-up prompt is a prompt message used to indicate that the current difference exists in the current charging process and charging is disconnected.

The pop-up prompt may be used to instruct a user to check in time whether there is a problem of liquid intake, corrosion, or the like for a charging port of the user terminal.

With reference to the ninth aspect, the first implementation of the ninth aspect, or the second implementation of the ninth aspect, in a third implementation of the ninth aspect, before the sending, by the user terminal, the circuit control command to the charge protection apparatus if the circuit control command is generated, the method further includes:

receiving, by the user terminal, a temperature of a charging cable that is sent by the charge protection apparatus; and determining, by the user terminal based on the temperature of the charging cable, whether to generate the circuit control command. The charging port can be better protected by using a temperature detection mechanism.

With reference to the third implementation of the ninth aspect, in a fourth implementation of the ninth aspect, the determining, by the user terminal based on the temperature of the charging cable, whether to generate the circuit control command includes:

if the temperature of the charging cable is greater than a first temperature threshold and less than a second temperature threshold, determining, by the user terminal, that the generated circuit control command is to keep charging; or if the temperature of the charging cable is greater than the second temperature threshold, determining, by the user terminal, that the generated circuit control command is to disconnect from charging.

It may be understood that, if the temperature of the charging cable is less than the first temperature threshold, the user terminal does not generate the circuit control command.

With reference to the fourth implementation of the ninth aspect, in a fifth implementation of the ninth aspect, the method further includes:

if the temperature of the charging cable is greater than the first temperature threshold and less than the second temperature threshold, outputting, by the user terminal, a third pop-up prompt on the screen, where the third pop-up prompt is a prompt message used to indicate that the temperature of the charging cable is extremely high in the current charging process; or if the temperature of the charging cable is greater than the second temperature threshold and less than the third temperature threshold, outputting, by the user terminal, a fourth pop-up prompt on the screen, where the fourth pop-up prompt is a prompt message used to indicate that the temperature of the charging cable is extremely high in the current charging process and charging is disconnected.

The pop-up prompt may be used to instruct the user to check in time whether there is a problem of liquid intake, corrosion, or the like for the charging port of the user terminal.

With reference to the ninth aspect, the first implementation of the ninth aspect, the second implementation of the ninth aspect, the third implementation of the ninth aspect, the fourth implementation of the ninth aspect, or the fifth implementation of the ninth aspect, in a sixth implementation of the ninth aspect, before the sending, by the user terminal, the circuit control command to the charge protection apparatus if the circuit control command is generated, the method further includes:

receiving, by the user terminal, an external charging voltage sent by the charge protection apparatus; and determining, based on the external charging voltage, whether to generate the circuit control command. The user terminal can be better protected by performing external charging voltage detection.

With reference to the sixth implementation of the ninth aspect, in a seventh implementation of the ninth aspect, the determining, by the user terminal based on the external charging voltage, whether to generate the circuit control command includes:

if the external charging voltage is greater than a first voltage threshold and less than a second voltage threshold, determining, by the user terminal, that the generated circuit control command is to keep charging; or if the external charging voltage is greater than the second voltage threshold, determining, by the user terminal, that the generated circuit control command is to disconnect from charging.

It may be understood that, if the external charging voltage of the power cable is less than the first voltage threshold, the user terminal does not generate the circuit control command.

With reference to the seventh implementation of the ninth aspect, in an eighth implementation of the ninth aspect, the method further includes:

if the external charging voltage is greater than the first voltage threshold and less than the second voltage threshold, outputting, by the user terminal, a fifth pop-up prompt on the screen, where the fifth pop-up prompt is a prompt message used to indicate that the external charging voltage is extremely high in the current charging process; or if the external charging voltage is greater than the second voltage threshold and less than the third voltage threshold, outputting, by the user terminal, a sixth pop-up prompt on the screen, where the sixth pop-up prompt is a prompt message used to indicate that the external charging voltage is extremely high in the current charging process and charging is disconnected.

The pop-up prompt may be used to instruct the user to check in time whether there is a problem of liquid intake, corrosion, or the like for the charging port of the user terminal.

Optionally, the method further includes: outputting the internal charging current, the external charging current, and the external charging voltage on the screen. Further, optionally, the processing unit may output at least one of the internal charging current, the external charging current, and the external charging voltage.

Optionally, a first warning prompt is set in the circuit control command, and the first warning prompt is used to instruct the charge protection apparatus to perform a warning operation according to the first warning prompt. Further, optionally, at least one prompt mode and a time interval for executing each prompt mode are set in the first warning prompt.

With reference to the ninth aspect, the first implementation of the ninth aspect, the second implementation of the ninth aspect, the third implementation of the ninth aspect, the fourth implementation of the ninth aspect, the fifth implementation of the ninth aspect, the sixth implementation of the ninth aspect, the seventh implementation of the ninth aspect, or the eighth implementation of the ninth aspect, in a ninth implementation of the ninth aspect, the method further includes:

performing, by the user terminal, a warning operation based on a preset second warning prompt if the circuit control command is generated, where the second warning prompt includes at least one prompt mode. For example, the prompt mode may include one or more of a sound prompt mode, a flicker prompt mode, and an oscillation prompt mode, and the prompt mode in the second warning prompt is not limited to these prompt modes. The circuit control command may be a command for keeping charging or disconnecting from charging, and therefore the user terminal may set different prompt modes for different commands. In this way, the user is prompted in the prompt mode, so that the user can learn of a current charging status in time.

According to a tenth aspect, an embodiment of the present invention provides another user terminal, the user terminal includes a processor, a charging control IC, and a transceiver, and the processor is configured to execute the charging method provided in the fifth aspect of the present invention. Optionally, the user terminal may further include a memory, a display system, an audio frequency system, and/or an oscillator; the memory is configured to store application program code used for supporting a user terminal in executing the foregoing method; and the processor is configured to execute an application program stored in the memory.

According to an eleventh aspect, an embodiment of the present invention provides a computer storage medium, configured to store a computer software instruction used by the charge protection apparatus. The computer software instruction includes a program that is designed for executing the foregoing aspects.

According to a twelfth aspect, an embodiment of the present invention provides a computer storage medium, configured to store a computer software instruction used by the user terminal. The computer software instruction includes a program that is designed for executing the foregoing aspects.

In the embodiments of the present invention, names of the charging data cable and the user terminal impose no limitation on the devices. In an actual application, these devices may have other names, provided that functions of the devices are similar to those in the present invention and fall within the scope defined by the following claims and equivalent technologies of the present invention.

In the embodiments of the present invention, a charging current is monitored in real time, so that the user terminal monitors whether a leakage current exists in the current charging process, and in a case of the leakage current, the power cable is disconnected from charging in time by using the charge protection apparatus, so as to protect the user terminal.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

In solutions provided in the present invention, a charging current is monitored in real time, so that a user terminal monitors whether a leakage current exists in a current charging process, and in a case of the leakage current, a power cable is disconnected from charging in time by using a charge protection apparatus, so as to protect the user terminal. To make a person skilled in the art understand the technical solutions in the present invention better, the following clearly describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "first", "second", "third", "fourth", and the like are intended to distinguish between different objects but do not indicate a particular order. Moreover, the terms "include", "contain", and any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

"Embodiment" mentioned in this specification indicates that a particular characteristic, structure, or property that is related to the embodiment may be included in at least one embodiment of the present invention. The word occurring at different locations in this specification does not necessarily refer to a same embodiment, or an independent or alternate embodiment exclusive of another embodiment. A person skilled in the art understands, in explicit and implicit manners, that an embodiment described in this specification may be combined with another embodiment.

Figure 1:
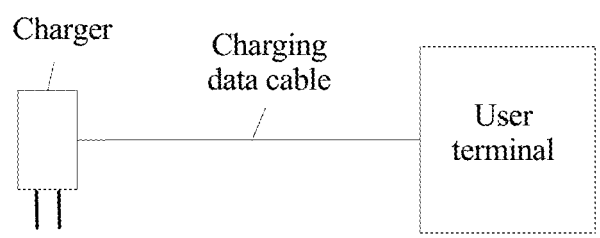
FIG. 1 is a possible schematic diagram of charging.

For ease of understanding the present invention, the following first describes an example diagram of existing charging. As shown in FIG. 1, to charge a user terminal, there may be a charger, a charging data cable, and the user terminal. In one manner, the charging data cable and the charger may be integrated together. In another manner, one end of the charging data cable and the charger may be connected by using a USB port. The charging data cable has a USB port at the other end of the charging data cable, and is connected to a charging port of the user terminal by using the USB port. In this way, the charging data cable is connected to the user terminal. The charging data cable further includes a charging cable. The charging cable may include a power cable, a data cable, and a ground cable. The data cable may include a positive data cable (Data+, D+) and a negative data cable (Data−, D−). If the charging data cable and the charger are integrated together, when the charger is connected to a power supply apparatus and the USB port at the other end of the charging data cable is connected to the user terminal, a function for charging the user terminal can be implemented. Alternatively, if the charging data cable and the user terminal are connected by using the USB port, a function for charging the user terminal can be implemented in a manner in which one end of the charging data cable is connected to a power supply apparatus, and the other end is connected to the user terminal, instead of using the charger. The power cable is used for charging, and if the power supply apparatus can further exchange data with the user terminal, data transmission can be implemented by using the data cable.

However, in an actual application, in a process in which the power supply apparatus charges the user terminal by using the charging data cable, a current flowing through the charging port is short-circuited to ground, and consequently the charging port is burned. In the embodiments of the present invention, a charge protection apparatus is provided. The charge protection apparatus includes a micro control unit (Micro Control Unit, MCU), a current detection circuit, a gating circuit, and an input/output (input/output, I/O) interface. The current detection circuit and the gating circuit are disposed on a power cable. In a charging process, if the gating circuit is in a closed state, the power cable remains in a charging connection; or if the gating circuit is in an open state, the power cable is disconnected from charging. The I/O interface and the data cable are connected, and the MCU sends data by using the I/O interface. The current detection circuit detects an external charging current flowing through the power cable. The current detection circuit transmits the external charging current to the MCU. The MCU transmits the external charging current to a user terminal by using the I/O interface, so that the user terminal calculates a current difference between the external charging current and an internal charging current detected by the user terminal, and determines, based on the current difference, whether to generate a circuit control command. The MCU receives the circuit control command sent by the user terminal, and controls, according to the circuit control command, the gating circuit to be in the closed state or the open state. A charging current is monitored in real time, so that the user terminal monitors whether a leakage current exists in a current charging process, and in a case of the leakage current, the power cable is disconnected from charging in time by using the charge protection apparatus, so as to protect the user terminal.

The USB port in the embodiments of the present invention may be a type-A USB port, a type-B USB port, a mini USB port, a micro USB port, or a lightning USB port. For example, if a USB port at one end of a charging data cable is a type-A male USB port, in one manner, the USB port is directly connected to a type-A female USB port of a power supply apparatus; in another manner, the USB port is connected to a type-A USB port disposed in a charger, and the charger is inserted into a power source socket to implement a connection between the USB port and a power source. A USB port at the other end of the charging data cable is a micro male USB port, and may be connected to a micro female USB port: a charging port of a user terminal, to implement a function for charging the user terminal. It may be understood that, although a port used for the charging data cable is a USB port currently, in the embodiments of the present invention, any transmission port for implementing electrical signal transmission and/or data signal transmission can be used for the charging data cable.

In the embodiments of the present invention, the user terminal may be any device that needs to be charged by using a charging port, such as a tablet computer, a mobile phone, a personal computer (Personal Computer, PC), a notebook computer, an in-vehicle device, a smart band, a smartwatch, or smart glasses.

Figure 2:
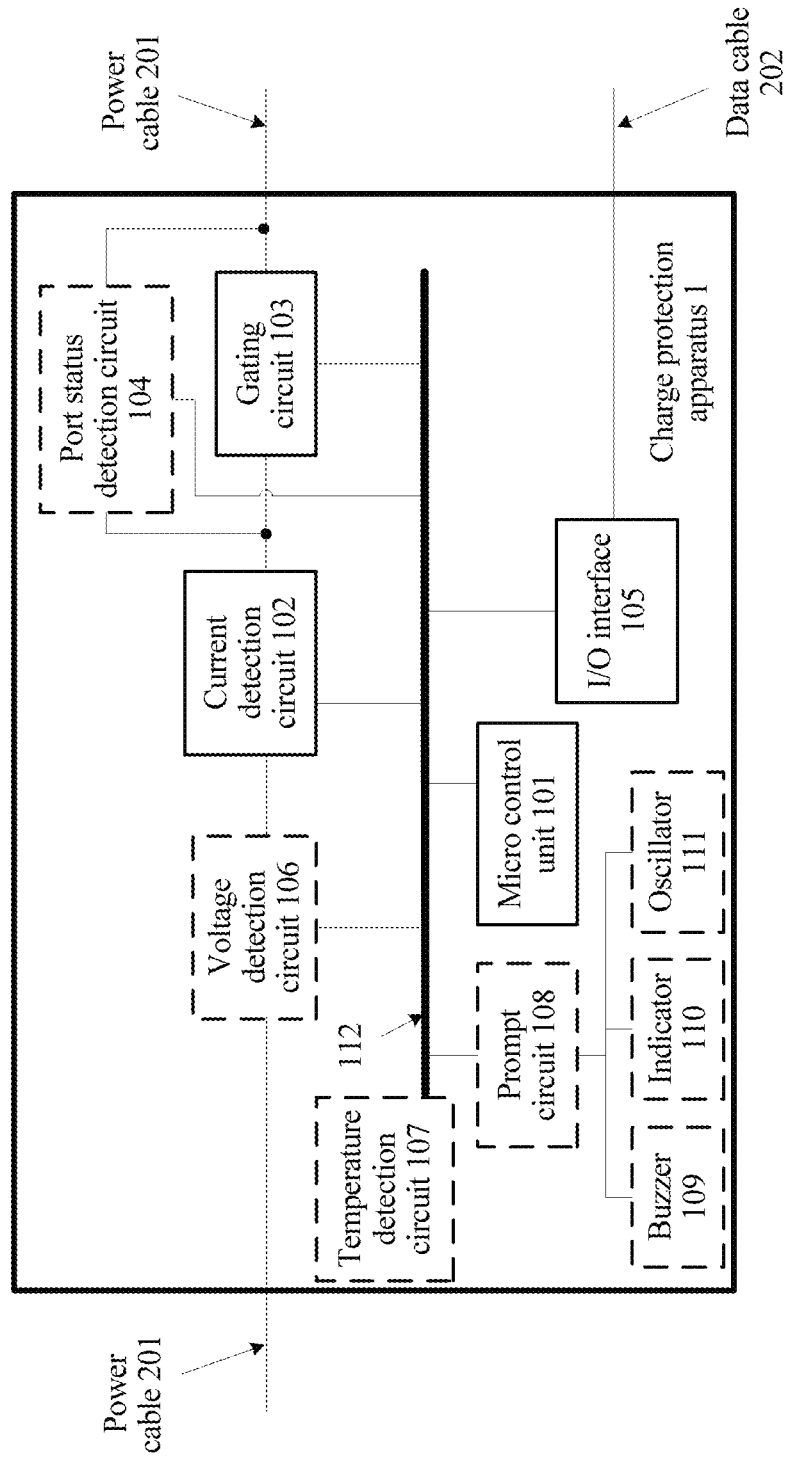
FIG. 2 is a schematic structural diagram of a charge protection apparatus according to an embodiment of the present invention.

Referring to FIG. 2, FIG. 2 is a schematic structural diagram of a charge protection apparatus according to an embodiment of the present invention. As shown in FIG. 2, the charge protection apparatus 1 is connected to a charging cable 2. The charging cable 2 includes a power cable 201 and a data cable 202. Optionally, the charging cable 2 includes a ground cable 203. The charge protection apparatus 1 includes a micro control unit 101, a current detection circuit 102, a gating circuit 103, an I/O interface 105, and a bus 112. Optionally, the charge protection apparatus 1 further includes a port status detection circuit 104. Optionally, the charge protection apparatus 1 further includes a voltage detection circuit 106 and/or a temperature detection circuit 107. Optionally, the charge protection apparatus 1 may further include a prompt circuit 108, a buzzer 109, an indicator 110, and an oscillator 111.

The current detection circuit 102 and the gating circuit 103 are disposed on the power cable 201. In a charging process, if the gating circuit 103 is in a closed state, the power cable 201 remains in a charging connection; or if the gating circuit 103 is in an open state, the power cable 201 is disconnected from charging. The I/O interface 105 and the data cable 202 are connected. The MCU 101 sends data by using the I/O interface 105.

The bus 112 may include a channel, used to transmit information between the components included in the charge protection apparatus 1.

The current detection circuit 102 detects an external charging current flowing through the power cable 201. The current detection circuit 102 transmits the external charging current to the MCU 101. The MCU 101 transmits the external charging current to a user terminal by using the I/O interface 105, so that the user terminal calculates a current difference between the external charging current and an internal charging current detected by the user terminal, and determines, based on the current difference, whether to generate a circuit control command. Content about this part is described in the following embodiment. The MCU 101 receives the circuit control command sent by the user terminal, and controls, according to the circuit control command, the gating circuit 103 to be in the closed state or the open state. In this way, a charging current of the charge protection apparatus can be monitored in real time, so that the user terminal monitors whether a leakage current exists in the current charging process, and in a case of the leakage current, the power cable is disconnected from charging in time by using the charge protection apparatus, so as to protect the user terminal.

If the circuit control command is to keep charging, the MCU 101 controls the gating circuit 103 to be in the closed state, so that the power cable 201 remains in the charging connection; or if the circuit control command is to disconnect from charging, the MCU 101 controls the gating circuit 103 to be in the open state, so that the power cable is disconnected from charging.

Optionally, the charge protection apparatus further includes the port status detection circuit 104. The port status detection circuit 104 and the gating circuit 103 are connected in parallel. When the gating circuit 103 is in the open state, if the port status detection circuit 104 detects that the gating circuit 103 is disconnected from the power supply apparatus or is disconnected from a charging port of the user terminal, the port status detection circuit 104 notifies the MCU 101 that the port connection has been broken, and the MCU 101 controls the gating circuit 103 to be in the closed state.

For example, the port status detection circuit 104 may include a current limiting resistor and a micro current detection circuit. Because the port status detection circuit 104 and the gating circuit 103 are connected in parallel, the port status detection circuit is equivalent to another closed circuit on the power cable. However, herein, setting a resistance value of the current limiting resistor can enable a current of the closed circuit to be at a milliampere scale or even smaller, and the current can be detected by using the micro current detection circuit. During specific implementation, if the micro current detection circuit detects a current greater than 0 in the closed circuit, it indicates that the user terminal is not disconnected from the power supply apparatus, and is not disconnected from the charging port of the user terminal, either. In this case, a connected state of the gating circuit 103 is not changed. If the micro current detection circuit detects a current 0 in the closed circuit, it indicates that the gating circuit 103 is disconnected from the power supply apparatus and is also disconnected from the charging port of the user terminal, and it further indicates that the user terminal is currently not charged. Therefore, on this premise, once the gating circuit 103 is in the open state, the port status detection circuit 104 notifies the MCU 101 that the gating circuit 103 is disconnected from the charging port, so that the MCU 101 controls the gating circuit 103 to restore to the closed state, helping the charge protection apparatus perform protection for a next charging connection.

For example, the MCU 101 may control, by using a high level signal, the gating circuit 103 to be in the closed state, and control, by using a low level signal, the gating circuit 103 to be in the open state. Specifically, the MCU 101 may send, to the gating circuit 103, a first digital signal indicating the high level signal, and the gating circuit 103 generates the high level signal through digital-analog conversion after receiving the first digital signal. The high level signal is used to control the gating circuit 103 to be in the closed state. Likewise, the MCU 101 may send, to the gating circuit 103, a second digital signal indicating the low level signal, and the gating circuit 103 generates the low level signal through digital-analog conversion after receiving the second digital signal. The low level signal is used to control the gating circuit 103 to be in the open state.

Figure 3A:
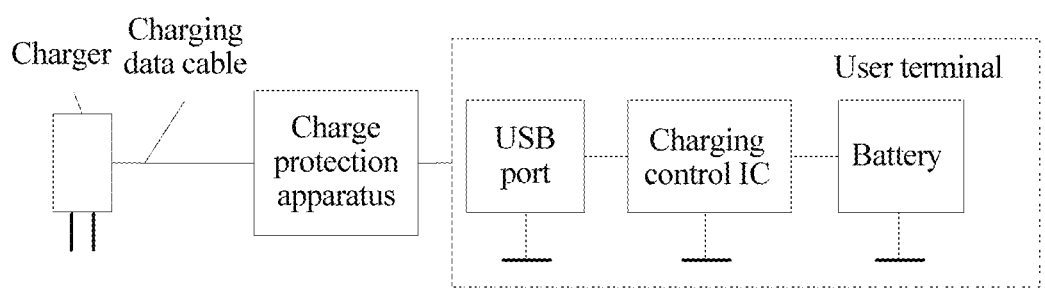
FIG. 3a is an example diagram of charging according to an embodiment of the present invention.

For another example, referring to FIG. 3*a*, FIG. 3*a* is an example diagram of charging according to an embodiment of the present invention. As shown in FIG. 3*a*, one end of a charging data cable is connected to a charger, and the other end is connected to a charging port of a user terminal. The charging data cable includes a charge protection apparatus. A charging cable connected to the charge protection apparatus is a cable in the charging data cable. In the user terminal, the charging port is connected to a charging control integrated circuit (integrated circuit, IC), and the charging control IC is connected to a battery of the user terminal. After the charger is connected to a power source, the user terminal can be charged by using the charging data cable. In a charging process, the charging data cable may detect an external charging current by using the charge protection apparatus. The charging control IC of the user terminal can detect an internal charging current of the user terminal. The user terminal compares the external charging current and the internal charging current, to detect whether a leakage current exists. Specifically, if a current difference between the external charging current and the internal charging current is less than a first current threshold (for example, the first current threshold is 5 milliampere or 1 milliampere), it may be considered that the battery of the user terminal is in a normal charging state, and no leakage current exists in the current charging process. If the current difference between the external charging current and the internal charging current is greater than the first current threshold, a leakage current exists in the current charging process. Some of currents flowing from the charging data cable to the charging port of the user terminal may flow into the charging control IC, and some of the currents may flow into a ground cable of the charging port. If there is an extremely high current in the ground cable of the charging port, the charging port may be burned due to overheating. Therefore, in this embodiment of the present invention, the charging data cable may receive a circuit control command that is generated by the user terminal based on a result of comparison between the internal charging current and the external charging current, and further control whether a power cable is disconnected from charging, so as to protect the user terminal. The charge protection apparatus is usually disposed near the port of the user terminal on the charging data cable.

Figure 3B:
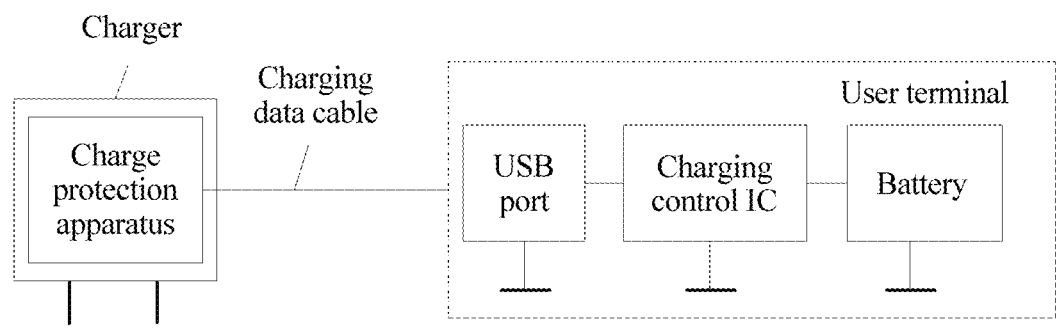
FIG. 3b is another example diagram of charging according to an embodiment of the present invention.

For another example, referring to FIG. 3*b*, FIG. 3*b* is another example diagram of charging according to an embodiment of the present invention. One end of a charging data cable is connected to a charger, and the other end is connected to a charging port of a user terminal. The charger includes a charge protection apparatus. The charger has a power cable and a ground cable. Therefore, when the charging data cable is connected to the charger, a power cable of the charging data cable is connected to the power cable of the charger. Then a data cable is disposed in the charger to connect to an I/O interface of the charge protection apparatus. The data cable may be connected to a data cable in the charging data cable when the charging data cable is connected to the charger. In the user terminal, the charging port is connected to a charging control IC, and the charging control IC is connected to a battery of the user terminal. After the charger is connected to a power source, the user terminal can be charged by using the charging data cable. In a charging process, the charging data cable can detect an external charging current by using the charge protection apparatus, and the charging control IC of the user terminal can detect an internal charging current of the user terminal. The user terminal compares the external charging current and the internal charging current, to detect whether a leakage current exists. Therefore, in this embodiment of the present invention, the charger may receive a circuit control command that is generated by the user terminal based on a result of comparison between the internal charging current and the external charging current, and further control whether the power cable is disconnected from charging, so as to protect the user terminal.

In a first feasible embodiment, based on the foregoing description, the charge protection apparatus 1 further includes the prompt circuit 108, the buzzer 109, the indicator 110, and the oscillator 111. During specific implementation, if the circuit control command further includes a first warning prompt, the MCU 101 performs a warning operation according to the first warning prompt by using the prompt circuit 108. The prompt circuit is configured to control whether the buzzer rings, control whether the indicator flickers, and/or control whether the oscillator oscillates.

Optionally, the charge protection apparatus may include one or more of the buzzer 109, the indicator 110, and the oscillator 111. It may be understood that, if the buzzer 109 is included, the first warning prompt may include a prompt mode in which the buzzer 109 rings; if the indicator 110 is included, the first warning prompt may include a prompt mode in which the indicator 110 flickers; or if the oscillator 111 is included, the first warning prompt may include a prompt mode in which the oscillator oscillates.

Further, optionally, a first time interval for ringing of the buzzer 109, a second time interval for flickering of the indicator 110, and/or a third time interval for oscillation of the oscillator 111 are/is set in the first warning prompt. In this case, that the MCU 101 controls, according to the first warning prompt by using the prompt circuit 108, the buzzer 109 to ring, controls the indicator 110 to flicker, and/or controls the oscillator 111 to oscillate is specifically: by using the prompt circuit 108, controlling the buzzer 109 to ring based on the first time interval, controlling the indicator 110 to flicker based on the second time interval, and/or controlling the oscillator 111 to oscillate based on the third time interval.

Further, for example, if the charge protection apparatus includes the indicator 110 and the oscillator 111, the first warning prompt may include only the prompt mode in which the indicator 110 flickers, or include only the prompt mode in which the oscillator 111 oscillates, or include the prompt mode in which the indicator 110 flickers and the prompt mode in which the oscillator 111 oscillates. Therefore, when the first warning prompt may include a plurality of prompt modes, one or more of the prompt modes may be selected for prompting. This is not limited in this embodiment of the present invention. In this way, a user is prompted in the prompt mode, so that the user can learn of a current charging status in time.

Optionally, in the example diagram of charging shown in FIG. 3a, the oscillator 111 may not be disposed in the charge protection apparatus 1, so as to reduce space occupied by the charge protection apparatus 1.

It should be noted that, in this embodiment of the present invention, the buzzer, the indicator, and the oscillator are set based on the time interval, or the buzzer, the indicator, and the oscillator may be set in a manner, for example, by using a timer, or based on a quantity of ringing times/a quantity of flickering times/a quantity of oscillation times, or based on different ringtone content/different indicator colors/different oscillation levels. The setting may be performed by a manufacturer or an end user. This is not limited in this embodiment of the present invention.

For example, if the MCU 101 receives the first warning prompt and the circuit control command for keeping charging that are sent by the user terminal, the MCU 101 sends an instruction that the gating circuit 103 is to remain in the closed state to the gating circuit 103, and sends, to the prompt circuit 108, an instruction that the buzzer 109 is to ring at intervals of 10 s and an instruction that the indicator 110 is to flicker in green at a low speed. If the MCU 101 receives the first warning prompt and the circuit control command for disconnecting from charging that are sent by the user terminal, the MCU 101 sends an instruction that the gating circuit 103 is to switch to the open state to the gating circuit 103, and sends, to the prompt circuit 108, an instruction that the buzzer 109 is to constantly ring and an instruction that the indicator 110 is to flicker in red at a high speed. If the MCU 101 has not received the circuit control command sent by the user terminal, the MCU 101 does not send an instruction to the gating circuit 103, and the buzzer 109 and the indicator 110 may remain in a default state (for example, the default state is a state in which the buzzer 109 does not ring and the indicator 110 does not flicker and is in an off state).

In a second feasible embodiment, if the charge protection apparatus 1 does not include the prompt circuit 108, the buzzer 109, the indicator 110, or the oscillator 111, or if the charge protection apparatus 1 includes the prompt circuit 108, the buzzer 109, the indicator 110, and the oscillator 111, the charge protection apparatus 1 further includes the temperature detection circuit 107. The temperature detection circuit 107 is configured to detect a temperature of the charging cable.

Specifically, the temperature detection circuit 107 transmits the detected temperature of the charging cable to the user terminal, so that the user terminal determines, based on the temperature of the charging cable, whether to generate the circuit control command. The MCU 101 receives the circuit control command sent by the user terminal, and controls, according to the circuit control command, the gating circuit 103 to be in the closed state or the open state.

If the circuit control command is to keep charging, the MCU 101 controls the gating circuit 103 to be in the closed state; or if the circuit control command is to disconnect from charging, the MCU 101 controls the gating circuit 103 to be in the open state.

Optionally, in the example diagram of charging shown in FIG. 3a, the charge protection apparatus 1 may be disposed at a position close to a USB port connected to the charging port of the user terminal, so that the temperature detection circuit 107 can more accurately detect a temperature around the charging port, so as to better protect the user terminal. A plurality of temperature detection circuits 107 may be disposed.

Optionally, in the example diagram of charging shown in FIG. 3b, a module other than the temperature detection circuit 107 in the charge protection apparatus 1 may be disposed in the charger, and the temperature detection circuit 107 may be independently disposed at a position close to a USB port connected to the charging port of the user terminal on the charging data cable, so that the temperature detection circuit 107 can more accurately detect a temperature around the charging port, so as to better protect the user terminal.

Further, if the charge protection apparatus 1 further includes the prompt circuit 108, the buzzer 109, the indicator 110, and the oscillator 111, the MCU 101 may further receive the circuit control command that carries the first warning prompt and that is sent by the user terminal, and the MCU 101 performs a warning operation according to the first warning prompt by using the prompt circuit 108.

It should be noted that, for the first warning prompt herein, refer to the first warning prompt described in the first feasible embodiment. Details are not described herein again.

In a third feasible embodiment, based on the foregoing feasible embodiments, the charge protection apparatus 1 further includes the voltage detection circuit 106, and the voltage detection circuit 106 is disposed on the power cable.

Specifically, the voltage detection circuit 106 detects an external charging voltage of the power cable, and the voltage detection circuit 106 transmits the external charging voltage to the MCU 101. The MCU 101 transmits the external charging voltage to the user terminal by using the I/O interface 105, so that the user terminal determines, based on the external charging voltage, whether to generate the circuit control command. The MCU 101 receives the circuit control command sent by the user terminal, and controls, according to the circuit control command, the gating circuit 103 to be in the closed state or the open state.

If the circuit control command is to keep charging, the MCU 101 controls the gating circuit 103 to be in the closed state; or if the circuit control command is to disconnect from charging, the MCU 101 controls the gating circuit 103 to be in the open state.

In this embodiment of the present invention, the charging current, the charging voltage, and the temperature of the charging cable are monitored in real time, so that the user terminal monitors whether a leakage current exists in the current charging process, whether a charging voltage is extremely high, and whether a temperature is extremely high, and in a case of the leakage current, the extremely high voltage, or the extremely high temperature, the power cable is disconnected in time by using the charge protection apparatus, so as to protect the user terminal. In addition, through triple detection of the charging current, the charging voltage, and the temperature of the charging cable, the user terminal can be better protected in the charging process.

Figure 4:
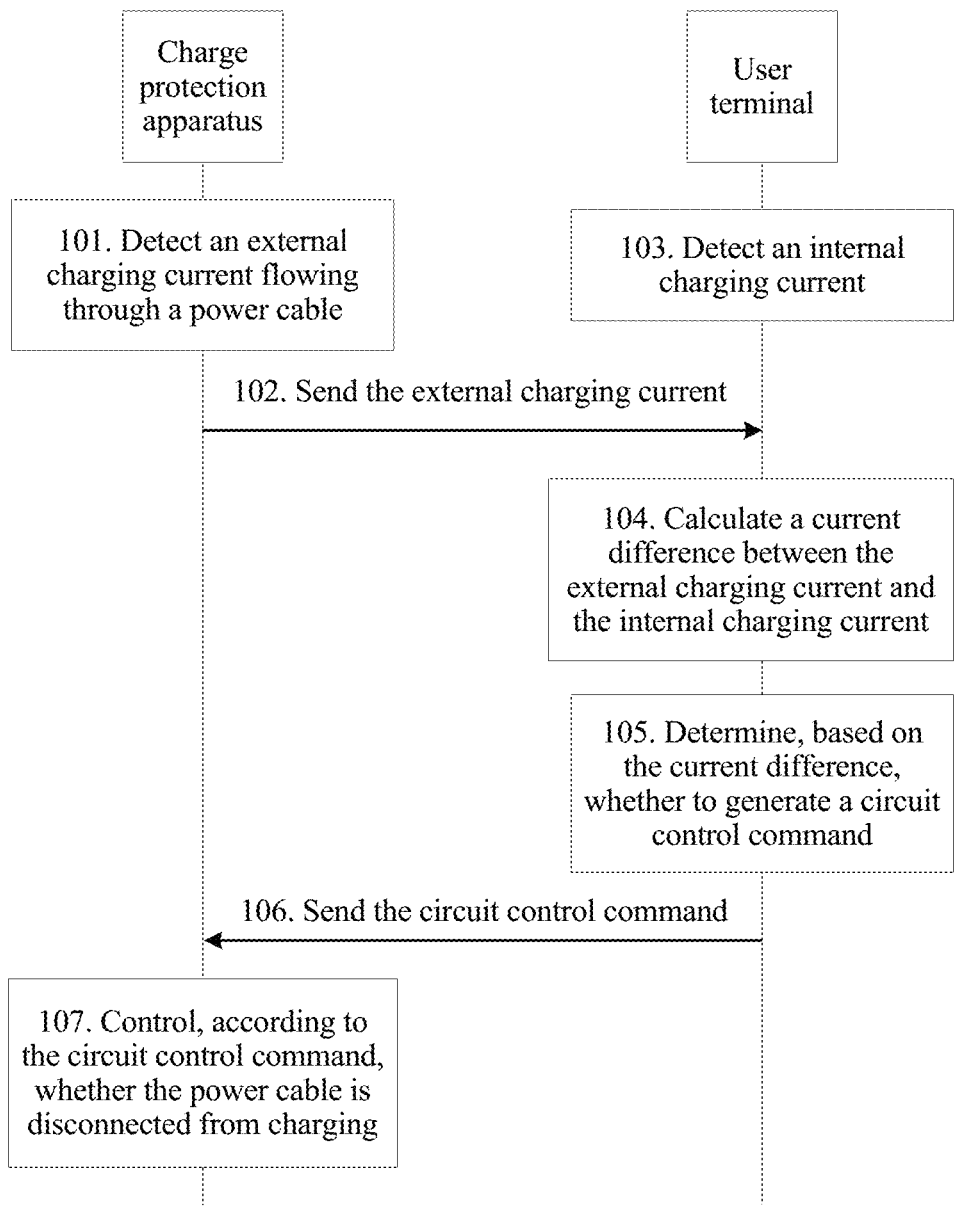
FIG. 4 is a schematic flowchart of a charging method according to an embodiment of the present invention.

Referring to FIG. 4, FIG. 4 is a schematic flowchart of a charging method according to an embodiment of the present invention. The embodiment shown in FIG. 4 is described from two perspectives of a charge protection apparatus and a user terminal. For the charge protection apparatus, refer to the charge protection apparatus in the embodiment shown in FIG. 2. In the embodiment shown in FIG. 4, the charge protection apparatus may be disposed in a charger or a charging data cable. Therefore, the charge protection apparatus is connected to a power supply apparatus by using the charger or the charging data cable. A USB port of the charging data cable is connected to a charging port of the user terminal. The method may include step 101 to step 107.

101. The charge protection apparatus detects an external charging current flowing through a power cable.

Specifically, the charge protection apparatus detects, by using a current detection circuit, the external charging current flowing through the power cable. It may be understood that, in a process of charging the user terminal, a current of the power supply apparatus is transmitted from the charge protection apparatus to the user terminal, and therefore the current first flows through the charge protection apparatus, and then is transmitted to the user terminal. Therefore, in this embodiment of the present invention, the external charging current and an internal charging current may be compared, to determine whether a leakage current exists in the current charging process.

102. The charge protection apparatus sends the external charging current to the user terminal.

Specifically, the charge protection apparatus sends the external charging current to the user terminal by using a data cable, and correspondingly, the user terminal receives the external charging current sent by the charge protection apparatus, so that the user terminal monitors the external charging current in the current charging process.

103. The user terminal detects an internal charging current.

Optionally, a charging control IC is disposed inside the user terminal, and the charging control IC is configured to detect the internal charging current flowing through a battery of the user terminal.

In a feasible solution, the user terminal may determine whether the internal charging current is greater than a fourth current threshold. The fourth current threshold is a maximum charging current that the user terminal can tolerate. If the internal charging current is less than or equal to the fourth current threshold, the user terminal performs step 104. If the internal charging current is greater than the fourth current threshold, in one solution, the user terminal proceeds to perform step 104, to detect whether a leakage current exists, and the user terminal performs a current limiting operation by using the charging control IC, so that the internal charging current is reduced to a value less than or equal to the fourth current threshold; in another solution, the user terminal does not perform step 104, but directly generates a circuit control command for disconnecting from charging, and performs step 106 to send the circuit control command to the charge protection apparatus, so that after the charge protection apparatus receives the circuit control command for disconnecting from charging, the power cable is disconnected by using the charge protection apparatus, so as to protect the user terminal.

104. The user terminal calculates a current difference between the external charging current and the internal charging current.

Specifically, the user terminal calculates the current difference between the external charging current detected by the charge protection apparatus and the internal charging current detected by the user terminal. The current difference may be used to detect whether a leakage current exists in the current charging process. If no leakage current exists, the current difference between the external charging current and the internal charging current is less than a first current threshold (for example, the first current threshold is 5 milliampere or 1 milliampere). If the current difference between the external charging current and the internal charging current is greater than the first current threshold, it indicates that a leakage current exists in the current charging process.

105. The user terminal determines, based on the current difference, whether to generate a circuit control command.

Specifically, if the current difference is greater than the first current threshold and less than a second current threshold, the user terminal determines that the generated circuit control command is to keep charging; or if the current difference is greater than the second current threshold and less than a third current threshold, the user terminal determines that the generated circuit control command is to disconnect from charging. It may be understood that, if the current difference is less than the first current threshold, the user terminal does not generate the circuit control command. The first current threshold, the second current threshold, and the third current threshold are real numbers greater than or equal to 0.

It should be noted that, in this embodiment of the present invention, based on the first current threshold, the second current threshold, and the third current threshold, there are three cases about whether to generate the circuit control command. Cases in which the current difference is equal to the first current threshold, the second current threshold, and the third current threshold may be respectively added to classifications in which the first current threshold, the second current threshold, and the third current threshold are respectively used as critical values, and a case in which the current difference is equal to one threshold cannot be added to different classifications. For example, the case in which the current difference is equal to the second current threshold may be added to a solution in which if the current difference is greater than the first current threshold and less than or equal to the second current threshold, it is determined that the generated circuit control command is to keep charging; or the case in which the current difference is equal to the second current threshold may be added to a solution in which if the current difference is greater than or equal to the second current threshold and less than the third current threshold, it is determined that the generated circuit control command is to disconnect from charging.

Figure 5A:
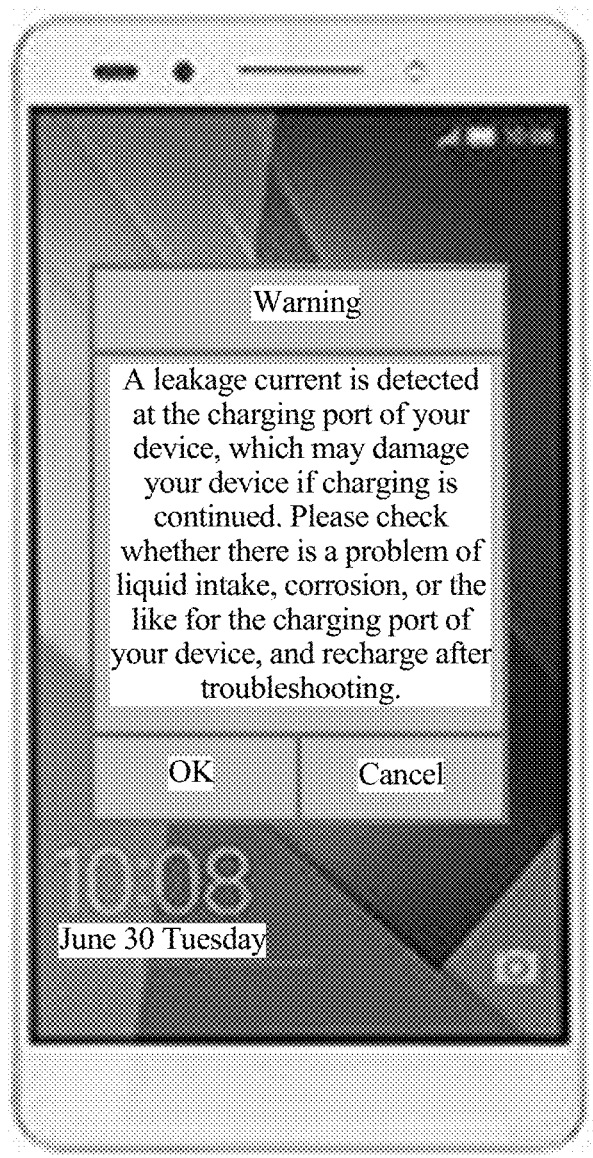
FIG. 5a is an example diagram of a prompt according to an embodiment of the present invention.

Optionally, if the current difference is greater than the first current threshold and less than the second current threshold, the user terminal outputs a first pop-up prompt on a screen. The first pop-up prompt is a prompt message used to indicate that the current difference exists in the current charging process. For example, referring to FIG. 5a, FIG. 5a is an example diagram of a prompt according to an embodiment of the present invention. As shown in FIG. 5a, if the current difference is greater than the first current threshold and less than the second current threshold, it indicates that a leakage current with a relatively small current exists in the current charging process, and a warning notice shown in FIG. 5a may be used to notify a user. The warning notice can be used to instruct the user to check whether there is a problem of liquid intake, corrosion, or the like for the charging port of the user terminal, so as to protect the charging port from being burned.

Figure 5B:
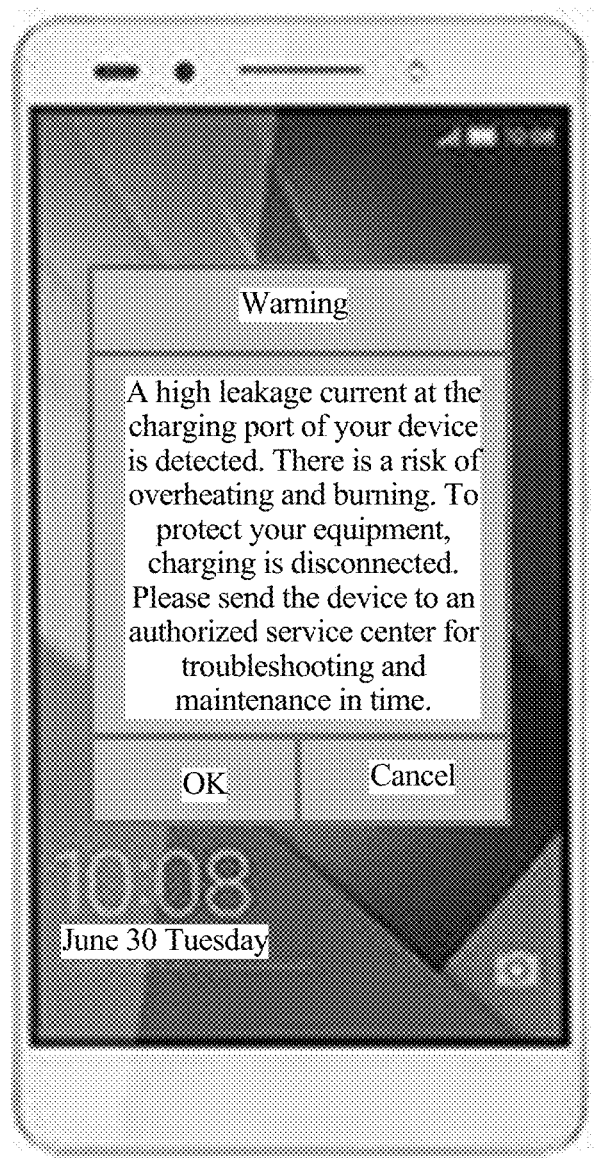
FIG. 5b is an example diagram of another prompt according to an embodiment of the present invention.

If the current difference is greater than the second current threshold and less than the third current threshold, the user terminal outputs a second pop-up prompt on the screen. The second pop-up prompt is a prompt message used to indicate that the current difference exists in the current charging process and charging is disconnected. For example, referring to FIG. 5b, FIG. 5b is another example diagram of a prompt according to an embodiment of the present invention. As shown in FIG. 5b, if the current difference is greater than the second current threshold and less than the third current threshold, it indicates that a leakage current with a relatively large current exists in the current charging process, and a warning notice shown in FIG. 5b may be used to notify a user. The warning notice can be used to notify the user that charging is disconnected and instruct the user to check in time whether there is a problem of liquid intake, corrosion, or the like for the charging port of the user terminal.

106. The user terminal sends the circuit control command to the charge protection apparatus.

Specifically, the user terminal sends the circuit control command to the charge protection apparatus by using the data cable.

Correspondingly, the charge protection apparatus receives the circuit control command sent by the user terminal. It may be understood that, if the circuit control command sent by the user terminal is not received, the charge protection apparatus remains in a charging state, and in this case, the power cable remains in a charging connection.

107. The charge protection apparatus controls, according to the circuit control command, whether the power cable is disconnected from charging.

Specifically, in the process of charging the user terminal, if the received circuit control command is to keep charging, the charge protection apparatus controls the power cable to remain in the charging connection; or if the received circuit control command is to disconnect from charging, the charge protection apparatus controls the power cable to disconnect from charging. The charge protection apparatus may control a gating circuit to remain in a closed state, so that the power cable remains in the charging connection; or the charge protection apparatus may control the gating circuit to switch to an open state, so that the power cable is disconnected from charging.

In a feasible solution, if the circuit control command carries a first warning prompt, the charge protection apparatus performs a warning operation according to the first warning prompt. Optionally, the first warning prompt carries at least one prompt mode and a time interval for executing each prompt mode, and therefore the charge protection apparatus performs, based on the time interval for each prompt mode, an operation corresponding to each prompt mode. Optionally, in this embodiment of the present invention, the prompt mode may include but is not limited to at least one of a mode in which a buzzer rings, a mode in which an indicator flickers, and a mode in which an oscillator oscillates. It should be noted that, in this embodiment of the present invention, the buzzer, the indicator, and the oscillator are set based on the time interval, or the buzzer, the indicator, and the oscillator may be set in a manner, for example, by using a timer, or based on a quantity of ringing times/a quantity of flickering times/a quantity of oscillation times, or based on different ringtone content/different indicator colors/different oscillation levels. The setting may be performed by a manufacturer or an end user. This is not limited in this embodiment of the present invention.

In this embodiment of the present invention, a charging current is monitored in real time, so that the user terminal monitors whether a leakage current exists in the current charging process, and in a case of the leakage current, the power cable is disconnected in time by using the charge protection apparatus, so as to protect the user terminal.

Figure 6:
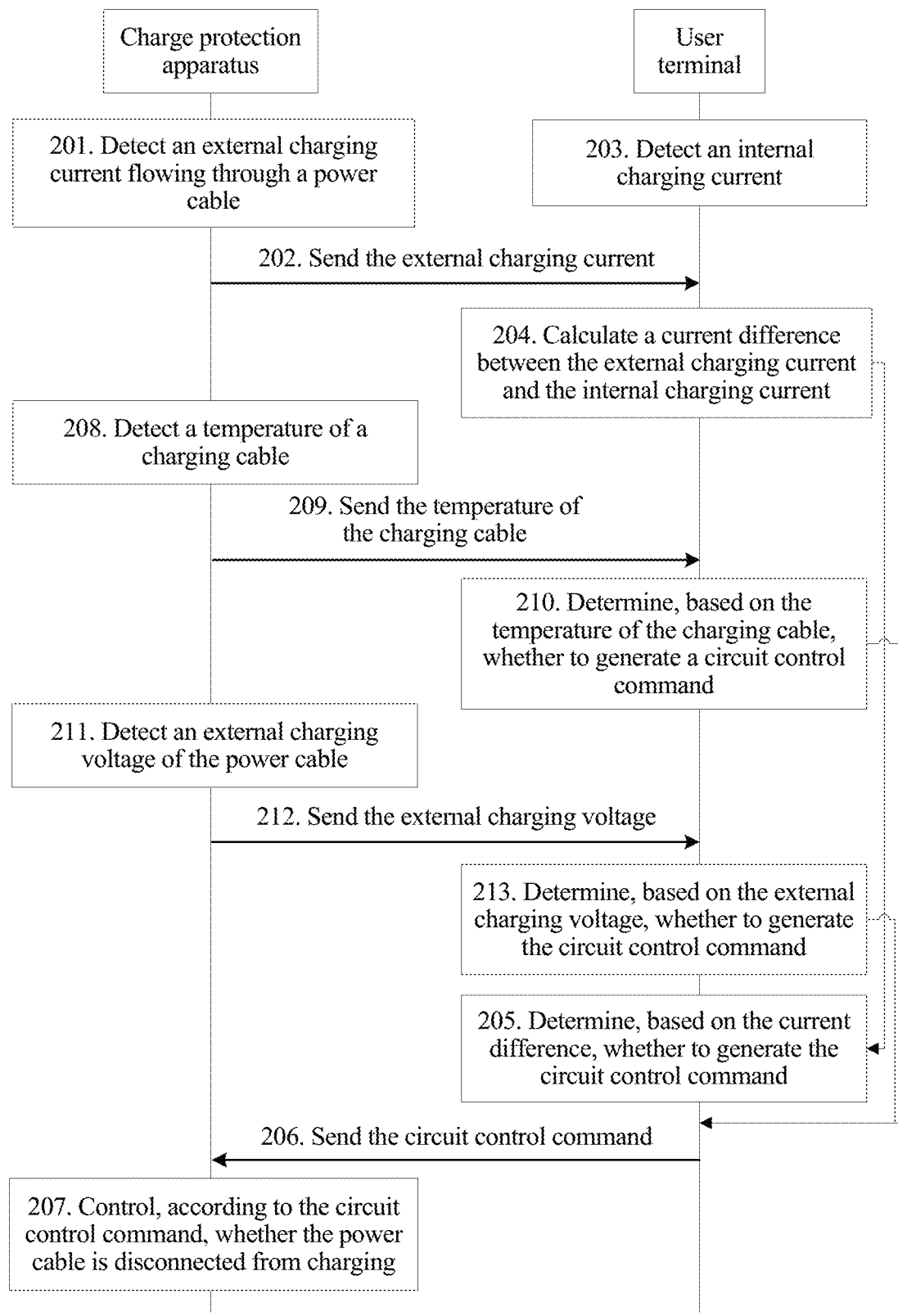
FIG. 6 is a schematic flowchart of another charging method according to an embodiment of the present invention.

Referring to FIG. 6, FIG. 6 is a schematic flowchart of a charging method according to an embodiment of the present invention. The embodiment shown in FIG. 6 is described from two perspectives of a charge protection apparatus and a user terminal. For the charge protection apparatus, refer to the charge protection apparatus in the embodiment shown in FIG. 2. In the embodiment shown in FIG. 6, the charge protection apparatus may be disposed in a charger or a charging data cable. Therefore, the charge protection apparatus is connected to a power supply apparatus by using the charger or the charging data cable. A USB port of the charging data cable is connected to a charging port of the user terminal. The method may include step 201 to step 213.

201. The charge protection apparatus detects an external charging current flowing through a power cable.

Specifically, the charge protection apparatus detects, by using a current detection circuit, the external charging current flowing through the power cable. It may be understood that, in a process of charging the user terminal, a current of the power supply apparatus is transmitted from the charge protection apparatus to the user terminal, and therefore the current first flows through the charge protection apparatus, and then is transmitted to the user terminal. Therefore, in this embodiment of the present invention, the external charging current and an internal charging current may be compared, to determine whether a leakage current exists in the current charging process.

202. The charge protection apparatus sends the external charging current to the user terminal.

Specifically, the charge protection apparatus sends the external charging current to the user terminal by using a data cable, and correspondingly, the user terminal receives the external charging current sent by the charge protection apparatus, so that the user terminal learns of the external charging current in the current charging process.

203. The user terminal detects an internal charging current.

Optionally, a charging control IC is disposed inside the user terminal, and the charging control IC is configured to detect the internal charging current flowing through a battery of the user terminal.

204. The user terminal calculates a current difference between the external charging current and the internal charging current.

205. The user terminal determines, based on the current difference, whether to generate a circuit control command.

206. The charge protection apparatus receives the circuit control command sent by the user terminal.

207. The charge protection apparatus controls, according to the circuit control command, whether the power cable is disconnected from charging.

For step 203 to step 207, refer to detailed descriptions of corresponding steps in the embodiment shown in FIG. 4. Details are not described herein again.

208. The charge protection apparatus detects a temperature of a charging cable.

Specifically, the charge protection apparatus detects the temperature of the charging cable by using a built-in temperature detection circuit. In the process of charging the user terminal, an extremely high temperature at the charging port may cause the charging port and the charge protection apparatus to be burned. Therefore, if the temperature detection circuit is at a position close to the USB port connected to the charging port of the user terminal, the temperature detection circuit can more accurately detect a temperature around the charging port, thereby improving detection accuracy.

Optionally, the charge protection apparatus may detect the external charging current and the temperature of the charging cable concurrently, and therefore step 201 and step 208 are performed in no particular order.

209. The charge protection apparatus sends the temperature of the charging cable to the user terminal.

Specifically, the charge protection apparatus sends the temperature of the charging cable to the user terminal by using the data cable, and correspondingly, the user terminal receives the temperature of the charging cable that is sent by the charge protection apparatus, so that the user terminal learns of the temperature of the charging cable in the current charging process.

210. The user terminal determines, based on the temperature of the charging cable, whether to generate the circuit control command.

Specifically, if the temperature of the charging cable is greater than a first temperature threshold and less than a second temperature threshold, the user terminal determines that the generated circuit control command is to keep charging; or if the temperature of the charging cable is greater than the second temperature threshold, the user terminal determines that the generated circuit control command is to disconnect from charging. It may be understood that, if the temperature of the charging cable is less than the first temperature threshold, the user terminal does not generate the circuit control command. The first temperature threshold, the second temperature threshold, and a third temperature threshold are real numbers greater than or equal to 0.

It should be noted that, in this embodiment of the present invention, based on the first temperature threshold, the second temperature threshold, and the third temperature threshold, there are three cases about whether to generate the circuit control command. Cases in which the temperature of the charging cable is equal to the first temperature threshold, the second temperature threshold, and the third temperature threshold may be respectively added to classifications in which the first temperature threshold, the second temperature threshold, and the third temperature threshold are respectively used as critical values, and a case in which the temperature of the charging cable is equal to one threshold cannot be added to different classifications. For example, the case in which the temperature of the charging cable is equal to the second temperature threshold may be added to a solution in which if the temperature of the charging cable is greater than the first temperature threshold and less than or equal to the second temperature threshold, it is determined that the generated circuit control command is to keep charging; or the case in which the temperature of the charging cable is equal to the second temperature threshold may be added to a solution in which if the temperature of the charging cable is greater than or equal to the second temperature threshold and less than the third temperature threshold, it is determined that the generated circuit control command is to disconnect from charging.

Figure 7A:
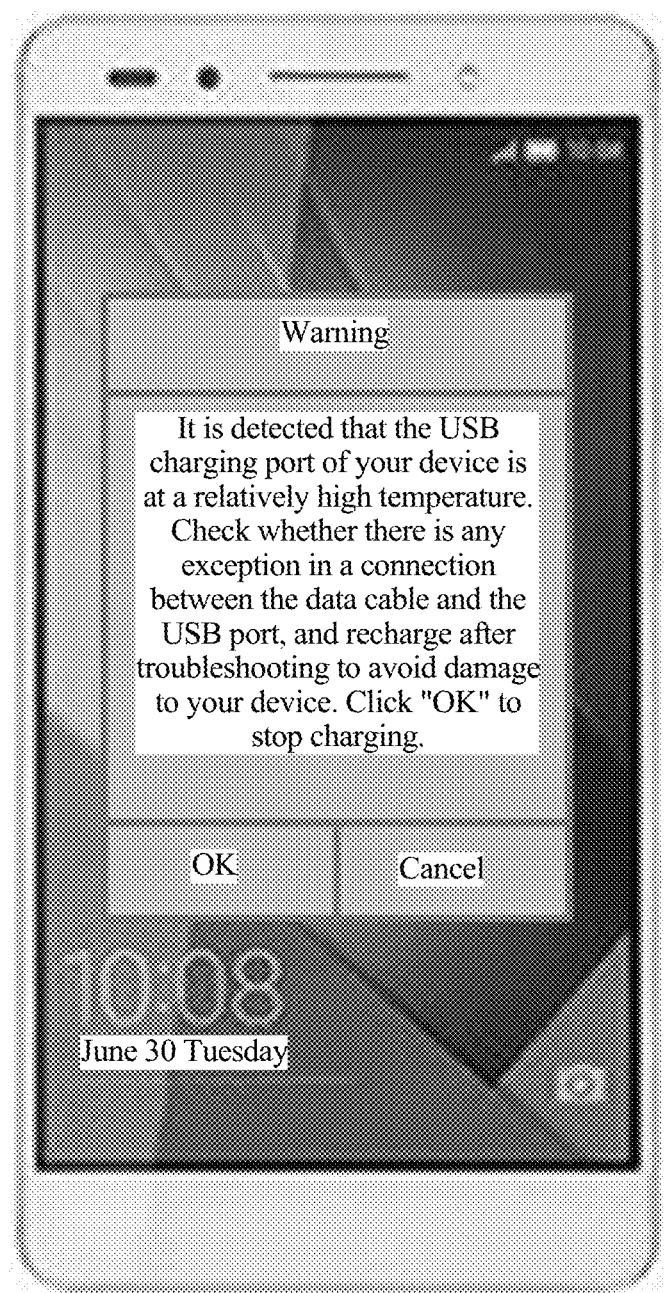
FIG. 7a is an example diagram of another prompt according to an embodiment of the present invention.

Optionally, if the temperature of the charging cable is greater than the first temperature threshold and less than the second temperature threshold, the user terminal outputs a third pop-up prompt on a screen. The third pop-up prompt is a prompt message used to indicate that the temperature of the charging cable is extremely high in the current charging process. For example, referring to FIG. 7a, FIG. 7a is another example diagram of a prompt according to an embodiment of the present invention. As shown in FIG. 7a, if the temperature of the charging cable is greater than the first temperature threshold and less than the second temperature threshold, it indicates that continuous heating may occur due to a short circuit in the current charging process, and a warning notice shown in FIG. 7a may be used to notify a user. The warning notice can be used to instruct the user to check whether there is any exception in a connection between a second USB port of the charge protection apparatus and the charging port of the user terminal, so as to protect the charging port from being burned due to continuous heating.

Figure 7B:
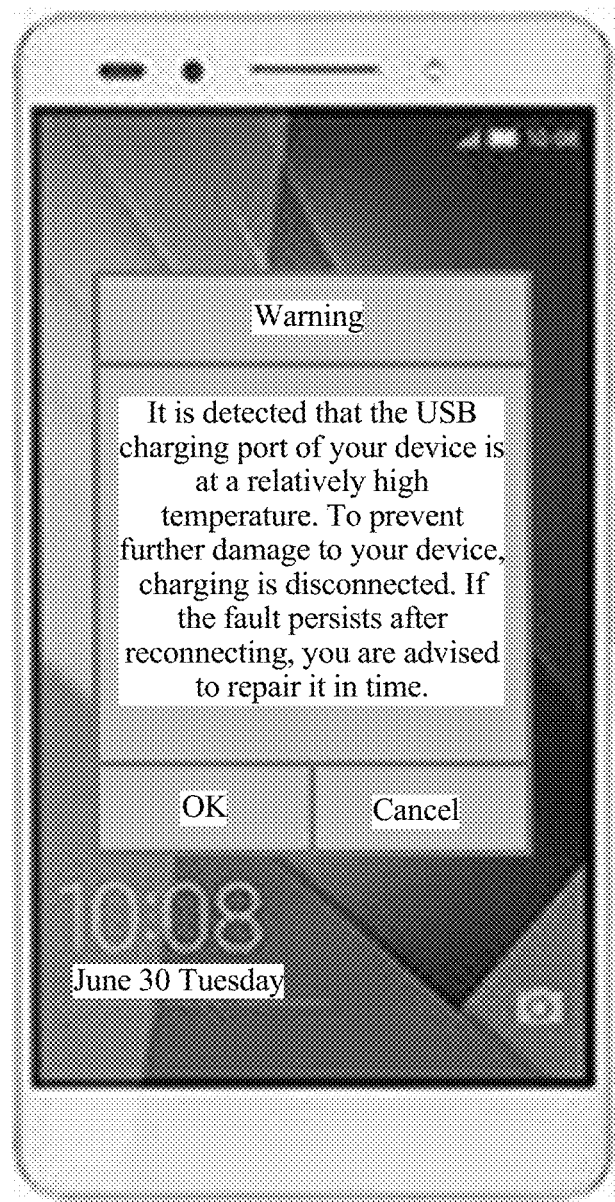
FIG. 7b is an example diagram of another prompt according to an embodiment of the present invention.

If the temperature of the charging cable is greater than the second temperature threshold and less than the third temperature threshold, the user terminal outputs a fourth pop-up prompt on the screen. The fourth pop-up prompt is a prompt message used to indicate that the temperature of the charging cable is extremely high in the current charging process and charging is disconnected. For example, referring to FIG. 7b, FIG. 7b is another example diagram of a prompt according to an embodiment of the present invention. As shown in FIG.

7b, if the temperature of the charging cable is greater than the second temperature threshold and less than the third temperature threshold, it indicates that a temperature is extremely high in the current charging process, and a warning notice shown in FIG. 7b may be used to notify a user. The warning notice can be used to notify the user that charging is disconnected and instruct the user to check in time whether there is any exception in a connection between a second USB port of the charge protection apparatus and the charging port of the user terminal.

After step 210, if the user terminal determines to generate the circuit control command, the following steps are performed: step 206 of sending the circuit control command to the charge protection apparatus and step 207 of controlling, according to the circuit control command, whether the power cable is disconnected from charging. For details, refer to detailed descriptions of corresponding steps in the embodiment shown in FIG. 4. Details are not described herein again.

211. The charge protection apparatus detects an external charging voltage of the power cable.

Specifically, the charge protection apparatus detects the external charging voltage of the power cable by using a built-in voltage detection circuit.

Optionally, the charge protection apparatus may detect the external charging current, the temperature of the charging cable, and the external charging voltage of the power cable concurrently, and therefore step 201, step 208, and step 211 are performed in no particular order.

212. The charge protection apparatus sends the external charging voltage to the user terminal.

Specifically, the charge protection apparatus sends the external charging voltage to the user terminal by using the data cable, and correspondingly, the user terminal receives the external charging voltage sent by the charge protection apparatus, so that the user terminal learns of the external charging voltage in the current charging process.

213. The user terminal determines, based on the external charging voltage of the power cable, whether to generate the circuit control command.

Specifically, if the external charging voltage of the power cable is greater than a first voltage threshold and less than a second voltage threshold, the user terminal determines that the generated circuit control command is to keep charging; or if the external charging voltage of the power cable is greater than the second voltage threshold, the user terminal determines that the generated circuit control command is to disconnect from charging. It may be understood that, if the external charging voltage of the power cable is less than the first voltage threshold, the user terminal does not generate the circuit control command. The first voltage threshold, the second voltage threshold, and a third voltage threshold are real numbers greater than or equal to 0.

It should be noted that, in this embodiment of the present invention, based on the first voltage threshold, the second voltage threshold, and the third voltage threshold, there are three cases about whether to generate the circuit control command. Cases in which the external charging voltage of the power cable is equal to the first voltage threshold, the second voltage threshold, and the third voltage threshold may be respectively added to classifications in which the first voltage threshold, the second voltage threshold, and the third voltage threshold are respectively used as critical values, and a case in which the external charging voltage of the power cable is equal to one threshold cannot be added to different classifications. For example, the case in which the external charging voltage of the power cable is equal to the second voltage threshold may be added to a solution in which if the external charging voltage of the power cable is greater than the first voltage threshold and less than or equal to the second voltage threshold, it is determined that the generated circuit control command is to keep charging; or the case in which the external charging voltage of the power cable is equal to the second voltage threshold may be added to a solution in which if the external charging voltage of the power cable is greater than or equal to the second voltage threshold and less than the third voltage threshold, it is determined that the generated circuit control command is to disconnect from charging.

Optionally, if the external charging voltage of the power cable is greater than the first voltage threshold and less than the second voltage threshold, the user terminal outputs a fifth pop-up prompt on the screen. The fifth pop-up prompt is a prompt message used to indicate that the external charging voltage of the power cable is extremely high in the current charging process. For example, if the external charging voltage of the power cable is greater than the first voltage threshold and less than the second voltage threshold, it indicates that a charging voltage is extremely high in the current charging process, and a warning notice may be used to notify a user. The warning notice can be used to notify the user that currently the charging voltage is extremely high, and the user may determine whether the user terminal keeps charging.

If the external charging voltage of the power cable is greater than the second voltage threshold and less than the third voltage threshold, the user terminal outputs a sixth pop-up prompt on the screen. The sixth pop-up prompt is a prompt message used to indicate that the external charging voltage of the power cable is extremely high in the current charging process and charging is disconnected. For example, if the external charging voltage of the power cable is greater than the second voltage threshold and less than the third voltage threshold, it indicates that a voltage is extremely high in the current charging process, and a warning notice may be used to notify a user. The warning notice can be used to notify the user that charging is disconnected and the charging voltage is extremely high.

After step 213, if the user terminal determines to generate the circuit control command, the following steps are performed: step 206 of sending the circuit control command to the charge protection apparatus and step 207 of controlling, according to the circuit control command, whether the power cable is disconnected from charging. For details, refer to detailed descriptions of corresponding steps in the embodiment shown in FIG. 4. Details are not described herein again.

Optionally, the user terminal may further output the internal charging current and the external charging current on the screen.

Optionally, the user terminal may further output the temperature of the charging cable on the screen.

Optionally, the user terminal may further output the external charging voltage on the screen.

It should be noted that, in this embodiment of the present invention, step 208 and step 209 are performed if the temperature detection circuit is built in the charge protection apparatus. Therefore, provided that the charge protection apparatus includes the temperature detection circuit, the solution of step 208 and step 209 may be executed. If a leakage current exists at the charging port and the charging port remains in a charging state for a long time, the charging cable in the charge protection apparatus continuously emits heat. A probability that the charge protection apparatus is burned can be reduced by detecting the temperature of the charging cable. Further, if the temperature detection circuit is at the position close to the USB port connected to the charging port of the user terminal, the temperature detection circuit can more accurately detect the temperature around the charging port, thereby improving detection accuracy.

It should also be noted that, in this embodiment of the present invention, step 211 and step 212 are performed if the voltage detection circuit is built in the charge protection apparatus. Therefore, provided that the temperature detection circuit is built in the charge protection apparatus, step 211 and step 212 may be performed.

Optionally, when the power cable is disconnected from charging, if it is detected that the power cable is disconnected from the power supply apparatus or is disconnected from the charging port of the user terminal, the charge protection apparatus controls the power cable to establish a charging connection. In this way, after the power cable is disconnected from charging, when the charge protection apparatus is not used to charge the user terminal, the power cable is restored to a charging connection state, so that the charge protection apparatus performs protection for a next charging connection.

Optionally, when the user terminal generates the circuit control command, the user terminal performs a warning operation based on a preset second warning prompt. The second warning prompt includes at least one prompt mode. For example, the prompt mode may include one or more of a sound prompt mode, a flicker prompt mode, and an oscillation prompt mode, and the prompt mode in the second warning prompt is not limited to these prompt modes. The circuit control command may be a command for keeping charging or disconnecting from charging, and therefore the user terminal may set different prompt modes for different commands. In this way, the user is prompted in the prompt mode, so that the user can learn of a current charging status in time.

For example, if the circuit control command is to keep charging, the user terminal may provide a sound prompt by using a first ringtone. For another example, if the circuit control command is to disconnect from charging, the user terminal may provide a sound prompt by using a second ringtone and provide an oscillation prompt.

In this embodiment of the present invention, the charging current, the charging voltage, and the temperature of the charging cable are monitored in real time, so that the user terminal monitors whether a leakage current exists in the current charging process, whether a charging voltage is extremely high, and whether a temperature is extremely high, and in a case of the leakage current, the extremely high voltage, or the extremely high temperature, the power cable is disconnected in time by using the charge protection apparatus, so as to protect the user terminal. In addition, through triple detection of the charging current, the charging voltage, and the temperature of the charging cable, the user terminal can be better protected in the charging process.

Figure 8:
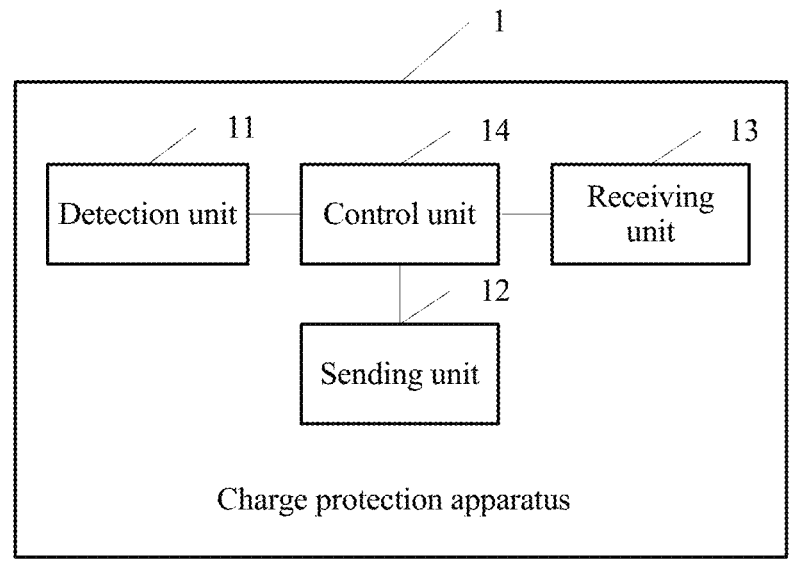
FIG. 8 is a schematic modular diagram of a charge protection apparatus according to an embodiment of the present invention.

Referring to FIG. 8, FIG. 8 is a schematic modular diagram of a charge protection apparatus according to an embodiment of the present invention. As shown in FIG. 8, the charge protection apparatus 1 in this embodiment of the present invention may include a detection unit 11, a sending unit 12, a receiving unit 13, and a control unit 14.

The control unit 14 is configured to detect an external charging current of a power cable by using the detection unit 11;

the control unit 14 is further configured to send the external charging current to a user terminal by using the sending unit 12, so that the user terminal calculates a current difference between the external charging current and an internal charging current detected by the user terminal, and determines, based on the current difference, whether to generate a circuit control command;

the control unit 14 is further configured to receive, by using the receiving unit 13, the circuit control command sent by the user terminal; and the control unit 14 is further configured to control, according to the circuit control command, whether the power cable is disconnected from charging.

In a possible embodiment, the control unit 14 is further configured to: detect a temperature of a charging cable by using the detection unit 11, and send the temperature of the charging cable to the user terminal, so that the user terminal determines, based on the temperature of the charging cable, whether to generate the circuit control command.

In a possible embodiment, the control unit 14 is further configured to: detect an external charging voltage of the power cable by using the detection unit 11, and send the external charging voltage to the user terminal, so that the user terminal determines, based on the external charging voltage, whether to generate the circuit control command.

In a possible embodiment, with regard to the controlling, according to the circuit control command, whether the power cable is disconnected from charging, the control unit 14 is specifically configured to:

if the circuit control command is to keep charging, control the power cable to remain in a charging connection; or if the circuit control command is to disconnect from charging, control the power cable to disconnect from charging.

In a possible embodiment, the control unit 14 is further configured to: if a first warning prompt is set in the circuit control command, perform a warning operation according to the first warning prompt.

In a possible embodiment, at least one prompt mode and a time interval for executing each prompt mode are set in the first warning prompt; and the control unit 14 is specifically configured to: if the first warning prompt is set in the circuit control command, perform, based on the time interval for each prompt mode, an operation corresponding to each prompt mode.

In a possible embodiment, the control unit 14 is further configured to: when the power cable is disconnected from charging, if it is detected that the power cable is disconnected from the power supply apparatus or is disconnected from a charging port of the user terminal, control the power cable to establish a charging connection.

It should be noted that, functions and beneficial effects of functional units of the charge protection apparatus 1 described in this embodiment of the present invention may be specifically described according to the method in the method embodiment shown in FIG. 4 or FIG. 5. Details are not described herein again.

In this embodiment, the charge protection apparatus 1 is presented in a form of a functional unit. The "unit" herein may be an application-specific integrated circuit (application-specific integrated circuit, ASIC), a circuit, a processor executing one or more software or firmware programs, an integrated logic circuit, and/or another component capable of providing the foregoing functions. In a simple embodiment, a person skilled in the art may figure out that the form shown in FIG. 2 may be used for the charge protection apparatus 1.

An embodiment of the present invention further provides a computer storage medium, configured to store a computer software instruction used by the charge protection apparatus 1 shown in FIG. 8. The computer software instruction includes a program designed for the charge protection apparatus 1 to execute the foregoing methods.

Figure 9:
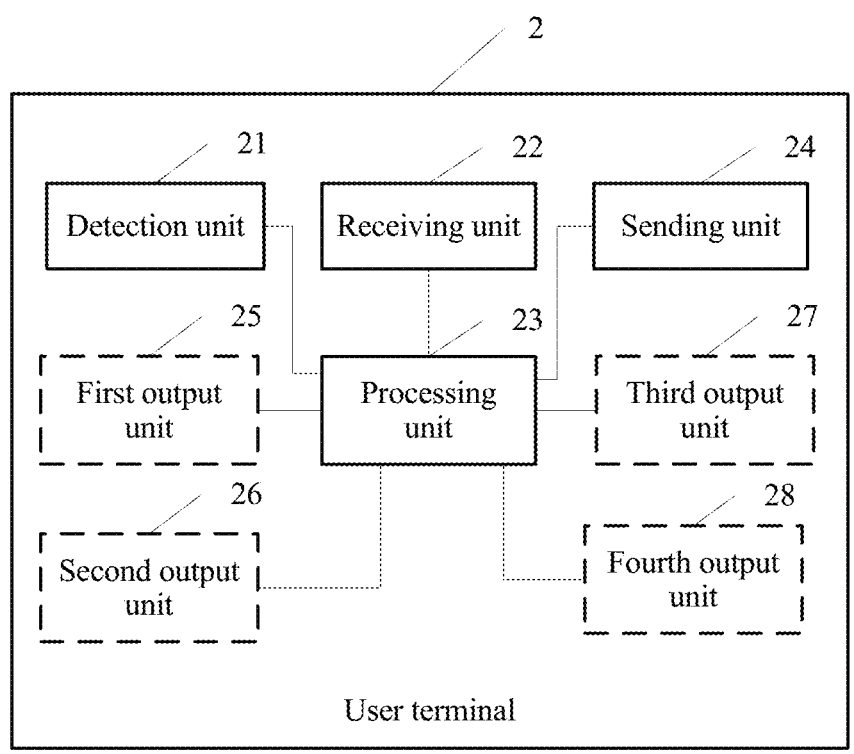
FIG. 9 is a schematic modular diagram of a user terminal according to an embodiment of the present invention.

Referring to FIG. 9, FIG. 9 is a schematic modular diagram of a user terminal 2 according to an embodiment of the present invention. As shown in FIG. 9, the user terminal 2 in this embodiment of the present invention may include a detection unit 21, a receiving unit 22, a processing unit 23, and a sending unit 24. Optionally, the user terminal 2 may further include a first output unit 25, a second output unit 26, a third output unit 27, and/or a fourth output unit 28.

The processing unit 23 is configured to detect an internal charging current by using the detection unit 21;

the processing unit 23 is further configured to receive, by using the receiving unit 22, an external charging current sent by the charge protection apparatus;

the processing unit 23 is further configured to calculate a current difference between the external charging current and the internal charging current;

the processing unit 23 is further configured to determine, based on the current difference, whether to generate a circuit control command; and the processing unit 23 is further configured to: if the circuit control command is generated, send the circuit control command to the charge protection apparatus by using the sending unit 24.

In a possible embodiment, with regard to the determining, based on the current difference, whether to generate a circuit control command, the processing unit 23 is specifically configured to:

if the current difference is greater than a first current threshold and less than a second current threshold, determine that the generated circuit control command is to keep charging; or if the current difference is greater than the second current threshold and less than a third current threshold, determine that the generated circuit control command is to disconnect from charging.

In a possible embodiment, the user terminal 2 further includes the first output unit 25;

the processing unit 23 is further configured to: if the current difference is greater than the first current threshold and less than the second current threshold, output a first pop-up prompt on a screen by using the first output unit 25, where the first pop-up prompt is a prompt message used to indicate that the current difference exists in a current charging process; and the processing unit 23 is further configured to: if the current difference is greater than the second current threshold and less than the third current threshold, output a second pop-up prompt on the screen by using the first output unit 25, where the second pop-up prompt is a prompt message used to indicate that the current difference exists in the current charging process and charging is disconnected.

In a possible embodiment, the processing unit 23 is further configured to receive, by using the receiving unit 22, a temperature of a charging cable that is sent by the charge protection apparatus; and the processing unit 23 is further configured to determine, based on the temperature of the charging cable, whether to generate the circuit control command.

In a possible embodiment, with regard to the determining, based on the temperature of the charging cable, whether to generate the circuit control command, the processing unit 23 is specifically configured to:

if the temperature of the charging cable is greater than a first temperature threshold and less than a second temperature threshold, determine that the generated circuit control command is to keep charging; or if the temperature of the charging cable is greater than the second temperature threshold, determine that the generated circuit control command is to disconnect from charging.

In a possible embodiment, the user terminal 2 further includes the second output unit 26;

the processing unit 23 is further configured to: if the temperature of the charging cable is greater than the first temperature threshold and less than the second temperature threshold, output a third pop-up prompt on the screen by using the second output unit 26, where the third pop-up prompt is a prompt message used to indicate that the temperature of the charging cable is extremely high in the current charging process; and the processing unit 23 is further configured to: if the temperature of the charging cable is greater than the second temperature threshold and less than the third temperature threshold, output a fourth pop-up prompt on the screen by using the second output unit 26, where the fourth pop-up prompt is a prompt message used to indicate that the temperature of the charging cable is extremely high in the current charging process and charging is disconnected.

In a possible embodiment, the processing unit 23 is further configured to receive, by using the receiving unit 22, an external charging voltage sent by the charge protection apparatus; and the processing unit 23 is further configured to determine, based on the external charging voltage, whether to generate the circuit control command.

In a possible embodiment, with regard to the determining, based on the external charging voltage, whether to generate the circuit control command, the processing unit 23 is specifically configured to:

if the external charging voltage is greater than a first voltage threshold and less than a second voltage threshold, determine that the generated circuit control command is to keep charging; or if the external charging voltage is greater than the second voltage threshold, determine that the generated circuit control command is to disconnect from charging.

In a possible embodiment, the user terminal 2 further includes the third output unit 27;

the processing unit 23 is further configured to: if the external charging voltage is greater than the first voltage threshold and less than the second voltage threshold, output a fifth pop-up prompt on the screen by using the third output unit 27, where the fifth pop-up prompt is a prompt message used to indicate that the external charging voltage is extremely high in the current charging process; and the processing unit 23 is further configured to: if the external charging voltage is greater than the second voltage threshold and less than the third voltage threshold, output a sixth pop-up prompt on the screen by using the third output unit 27, where the sixth pop-up prompt is a prompt message used to indicate that the external charging voltage is extremely high in the current charging process and charging is disconnected.

In a possible embodiment, the user terminal 2 further includes the fourth output unit 28; and the processing unit 23 is further configured to output the internal charging current, the external charging current, and the external charging voltage on the screen by using the fourth output unit 28.

In a possible embodiment, a first warning prompt is set in the circuit control command, and the first warning prompt is used to instruct the charge protection apparatus to perform a warning operation according to the first warning prompt.

In a possible embodiment, at least one prompt mode and a time interval for executing each prompt mode are set in the first warning prompt.

In a possible embodiment, the processing unit 23 is further configured to perform a warning operation based on a preset second warning prompt if the circuit control command is generated, where the second warning prompt includes at least one prompt mode.

It should be noted that, functions and beneficial effects of functional units of the user terminal 2 described in this embodiment of the present invention may be specifically described according to the method in the method embodiment shown in FIG. 4 or FIG. 5. Details are not described herein again.

Figure 10:
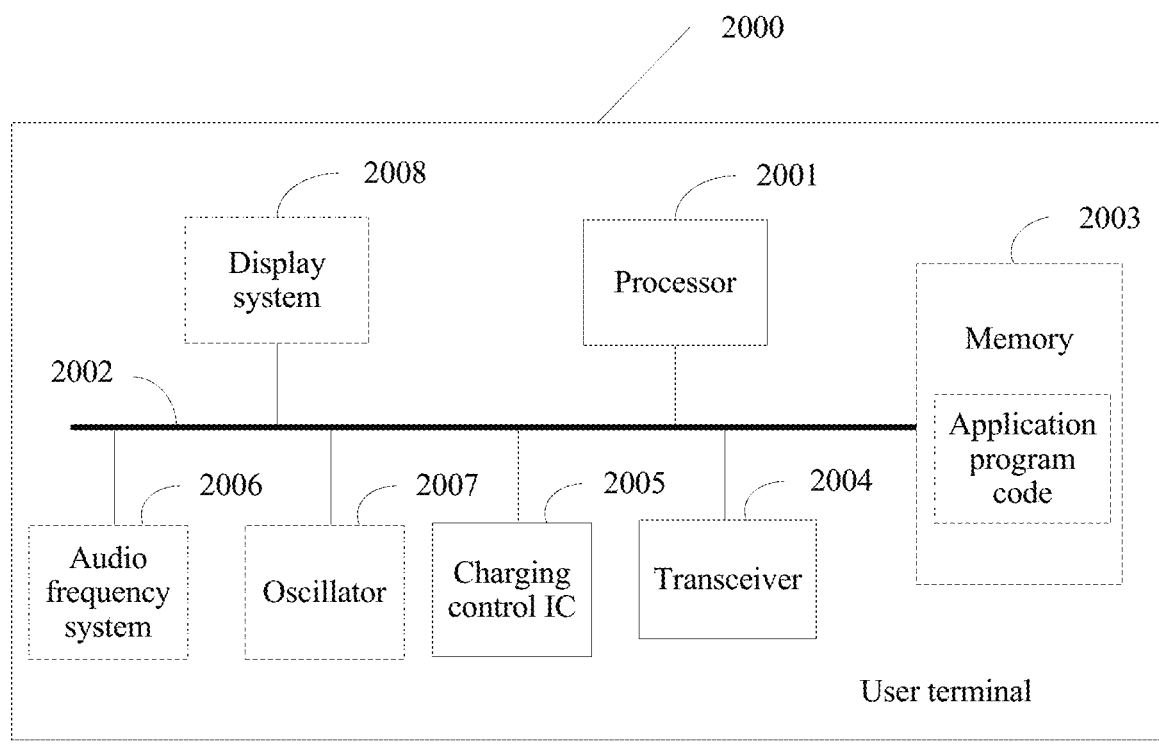
FIG. 10 is a schematic structural diagram of a user terminal according to an embodiment of the present invention.

In this embodiment, the user terminal 2 is presented in a form of a functional unit. The "unit" herein may be an application-specific integrated circuit (application-specific integrated circuit, ASIC), a circuit, a processor executing one or more software or firmware programs, an integrated logic circuit, and/or another component capable of providing the foregoing functions. In a simple embodiment, a person skilled in the art may figure out that a user terminal shown in FIG. 10 may be used for the user terminal in the embodiment shown in FIG. 9. As shown in FIG. 10, FIG. 10 is a schematic structural diagram of a user terminal according to an embodiment of the present invention. The user terminal 2000 includes at least one processor 2001, a bus 2002, a transceiver 2004, and a charging control IC 2005.

The processor 2001 and the transceiver 2004 are connected, for example, by using the bus 2002. Optionally, the user terminal 2000 may further include a memory 2003, the memory 2003 is configured to store data of the user terminal 2000 or store application program code used to execute the solutions of the present invention, and the processor 2001 is configured to control the execution. The processor 2001 is configured to execute the application program code stored in the memory 2003, to implement an action of the user terminal in the embodiment shown in FIG. 4 or FIG. 5.

Further, optionally, the user terminal 2000 may further include an audio frequency system 2006, an oscillator 2007, and/or a display system 2008. The audio frequency system 2006 is configured to output an audio frequency signal. The oscillator 2007 is configured to perform an oscillation operation. The display system 2008 is configured to output and display information and receive an operation input by a user.

It should be noted that, a quantity of transceivers 2004 is not limited in an actual application, and the user terminal 2000 does not impose a limitation on the embodiments of the present invention.

The processor 2001 in this embodiment of the present invention is configured to implement a function of the processing unit 23 shown in FIG. 9. The transceiver 2004 includes a receiver and a transmitter. The transceiver 2004 in this embodiment of the present invention is configured to implement functions of the receiving unit 22 and the sending unit 24 shown in FIG. 9. The charging control IC in this embodiment of the present invention is configured to implement a function of the detection unit 21 shown in FIG. 9. The display system 2008 in this embodiment of the present invention is configured to implement functions of the first output unit 25, the second output unit 26, the third output unit 27, and/or the fourth output unit 28 shown in FIG. 9. The audio frequency system 2006 and the oscillator 2007 are configured to output a plurality of prompt modes in the second warning prompt executed by the processor 2001.

The processor 2001 may be a central processing unit (Central Processing Unit, CPU), a general-purpose processor, a digital signal processor (Digital Signal Processor, DSP), an application-specific integrated circuit (Application-Specific Integrated Circuit, ASIC), a field-programmable gate array (Field-Programmable Gate Array, FPGA) or another programmable logic device, a transistor logic device, a hardware device, or any combination thereof. The processor 2001 may implement or execute various example logical blocks, modules, and circuits described with reference to content disclosed in the present invention. Alternatively, the processor 2001 may be a combination for implementing a computing function, for example, a combination including one or more microprocessors, a combination of a DSP and a microprocessor, or the like.

The bus 2002 may include a channel, used to transmit information between the foregoing components. The bus 2002 may be a Peripheral Component Interconnect (Peripheral Component Interconnect, PCI) bus, an extended industry standard architecture (Extended Industry Standard Architecture, EISA) bus, or the like. The bus 2002 may be classified into an address bus, a data bus, a control bus, and the like. For ease of representation, the bus is represented by using only one bold line in FIG. 10. However, this does not mean that there is only one bus or one type of bus.

The memory 2003 may be a read-only memory (read-only memory, ROM) or another type of static storage device capable of storing static information and instructions, a random access memory (random access memory, RAM) or another type of dynamic storage device capable of storing information and instructions, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compressed optical disc, a laser disc, an optical disc, a digital universal optical disc, a Blu-ray disc, and the like), a magnetic disk storage medium or another magnetic storage device, or any other medium capable of carrying or storing expected program code in a form of instructions or data structures and capable of being accessed by a computer. However, this is not limited herein.

An embodiment of the present invention further provides a computer storage medium, configured to store a computer software instruction used by the user terminal, and the computer software instruction includes a program designed for the user terminal to execute the foregoing methods.

It should be noted that, for ease of description, the foregoing method embodiments are represented as a series of actions. However, a person skilled in the art should appreciate that the present invention is not limited to the described order of the actions, because according to the present invention, some steps may be performed in other orders or simultaneously. In addition, a person skilled in the art should also appreciate that all the embodiments described in this specification are example embodiments, and the related actions and modules are not necessarily mandatory to the present invention.

In the foregoing embodiments, the descriptions of the embodiments have respective focuses. For a part that is not described in detail in an embodiment, refer to related descriptions in other embodiments.

A sequence of the steps of the method in the embodiments of the present invention may be adjusted, and steps may also be merged or removed as actually required.

Merging, division, and removing may be performed on the units in the apparatus in the embodiments of the present invention as actually required. A person skilled in the art may combine different embodiments and features of different embodiments described in this specification.

With descriptions of the foregoing embodiments, a person skilled in the art may clearly understand that the present invention may be implemented by hardware, firmware, or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The computer-readable medium may include but is not limited to: a random access memory (Random Access Memory, RAM), a read-only memory (Read-Only Memory, ROM), an electrically erasable programmable read-only memory (Electrically Erasable Programmable Read-Only Memory, EEPROM), a compact disc read-only memory (Compact Disc Read-Only Memory, CD-ROM) or another optical disk storage, a disk storage medium or another disk storage, or any other medium capable of carrying or storing expected program code in a form of instructions or data structures and capable of being accessed by a computer. In addition, any connection may be appropriately defined as a computer-readable medium. For example, if software is transmitted from a website, a server, or another remote source by using a coaxial cable, an optical fiber/cable, a twisted pair, a digital subscriber line (Digital Subscriber Line, DSL) or wireless technologies such as infrared ray, radio, and microwave, the coaxial cable, optical fiber/cable, twisted pair, DSL or wireless technologies such as infrared ray, radio, and microwave are included in definitions of a medium to which they belong. For example, a disk (Disk) and a disc (disc) used by the present invention include a compact disc (CD), a laser disc, an optical disc, a digital versatile disc (DVD), a floppy disk, and a Blu-ray disc, where the disk generally copies data by a magnetic means, and the disc copies data optically by a laser means. The foregoing combination should also be included in the protection scope of the computer-readable medium.

In conclusion, what is described above is merely example embodiments of the technical solutions of the present invention, but is not intended to limit the protection scope of the present invention. Any modification, equivalent replacement, or improvement made without departing from the spirit and principle of the present invention shall fall within the protection scope of the present invention.

The invention claimed is:

1. An apparatus, comprising:
a battery;
a processor coupled to the battery;
a screen coupled to the processor;
a charge interface coupled to the processor; and
a memory coupled to the processor and configured to store programming instructions that, when executed by the processor, cause the apparatus to be configured to:
perform charging of the battery when the charge interface is connected to a charger;
display on the screen a first user interface in response to detecting an abnormal condition of the charging interface, wherein the first user interface is a prompt that comprises first prompting information, second prompting information, a first option for a user to select a first operation related to charging, and a second option for the user to select a second operation related to charging, wherein the first prompting information indicates that charging is discontinued, and wherein the second prompting information indicates that liquid is detected in the charge interface;
resume charging of the battery in response to a first operation for the first option; and
continue discontinuing charging of the battery in response to a second operation for the second option.

2. The apparatus of claim 1, wherein the charge interface comprises a Universal Serial Bus (USB) interface or a LIGHTNING interface.

3. The apparatus of claim 1, wherein the first user interface further comprises third prompting information, and wherein the third prompting information instructs a user to check for liquid.

4. The apparatus of claim 1, wherein the abnormal condition comprises at least one of:
charging current of the apparatus is greater than a first threshold;
charging voltage of the apparatus is greater than a second threshold; or
charging temperature of the apparatus is greater than a third threshold.

5. The apparatus of claim 1, wherein the second option comprises a dismiss button.

6. The apparatus of claim 1, wherein the apparatus is a phone, a tablet, or a wearable device.

7. The apparatus of claim 1, wherein the second option comprises a button to continue discontinuing charging.

8. A computer program product comprising computer-executable instructions for storage on a non-transitory computer-readable medium that, when executed by a processor, cause an apparatus to be configured to:
perform charging of a battery of the apparatus when a charge interface is connected to a charger;
display on a screen of the apparatus a first user interface in response to detecting an abnormal condition of the charge interface, wherein the first user interface is a prompt that comprises first prompting information, second prompting information, a first option to a user to select an operation related to charging, and a second option for the user to select a second operation related to charging, wherein the first prompting information indicates that charging is discontinued, and wherein the second prompting information indicates that liquid is detected in the charge interface;
resume charging of the battery in response to a first operation for the first option; and
continue discontinuing charging of the battery in response to a second operation for the second option.

9. The computer program product of claim 8, wherein the charge interface comprises a Universal Serial Bus (USB) interface or a LIGHTNING interface.

10. The computer program product of claim 8, wherein the first user interface further comprises third prompting information, and wherein the third prompting information instructs a user to check for liquid.

11. The computer program product of claim 8, wherein the abnormal condition comprises at least one of:
charging current of the apparatus is greater than a first threshold;
charging voltage of the apparatus is greater than a second threshold; or
charging temperature of the apparatus is greater than a third threshold.

12. The computer program product of claim 8, wherein the second option comprises a dismiss button.

13. The computer program product of claim 8, wherein the apparatus is a phone, a tablet, or a wearable device.

14. The computer program product of claim 8, wherein the second option comprises a button to continue discontinuing charging.

15. A charging method, comprising:
performing charging of a battery of an apparatus when a charge interface is connected with a charger;
displaying on a screen of the apparatus a first user interface in response to detecting an abnormal condition of the charging interface, wherein the first user interface is a prompt that comprises first prompting information, second prompting information, a first option to a user to select a first operation related to charging, and a second option for the user to select a second operation related to charging, wherein the first prompting information indicates that charging is discontinued, and wherein the second prompting information indicates that liquid is detected in the charge interface; and
either:
resuming charging of the battery in response to a first operation for the first option; or
continuing to discontinue charging of the battery in response to a second operation for the second option.

16. The charging method of claim 15, wherein the charge interface comprises a Universal Serial Bus (USB) interface or a LIGHTNING interface.

17. The charging method of claim 15, wherein the first user interface further comprises third prompting information, and wherein the third prompting information instructs a user to check for liquid.

18. The charging method of claim 15, wherein the abnormal condition comprises at least one of:
charging current of the apparatus is greater than a first threshold;
charging voltage of the apparatus is greater than a second threshold; or
charging temperature of the apparatus is greater than a third threshold.

19. The charging method of claim 15, wherein the second option comprises a dismiss option.

20. The charging method of claim 15, wherein the second option comprises a button to continue discontinuing charging.

* * * * *